US012808551B2

(12) United States Patent
Booy

(10) Patent No.: US 12,808,551 B2
(45) Date of Patent: Nov. 24, 2026

(54) ENERGY STORAGE SYSTEM AND METHOD OF OPERATING SAME

(71) Applicant: Daniel James Booy, Vancouver (CA)

(72) Inventor: Daniel James Booy, Vancouver (CA)

( * ) Notice: Subject to any disclaimer, the term of this patent is extended or adjusted under 35 U.S.C. 154(b) by 155 days.

(21) Appl. No.: 18/870,580

(22) PCT Filed: Jun. 9, 2023

(86) PCT No.: PCT/CA2023/050802
§ 371 (c)(1),
(2) Date: Nov. 29, 2024

(87) PCT Pub. No.: WO2023/235990
PCT Pub. Date: Dec. 14, 2023

(65) Prior Publication Data

US 2025/0347427 A1 Nov. 13, 2025

Related U.S. Application Data

(60) Provisional application No. 63/351,069, filed on Jun. 10, 2022.

(51) Int. Cl.
*F24D 19/10* (2006.01)
*F24D 3/18* (2006.01)
(Continued)

(52) U.S. Cl.
CPC ........... *F24D 19/1039* (2013.01); *F24D 3/18* (2013.01); *F24S 50/40* (2018.05); *F24T 10/10* (2018.05);
(Continued)

(58) Field of Classification Search
CPC .... F24D 19/1039; F24D 3/18; F24D 2200/11; F24D 2200/12; F24D 2200/14; F24S 50/40; F24T 10/10; F24T 2010/56
(Continued)

(56) References Cited

U.S. PATENT DOCUMENTS 2,584,573 A * 2/1952 Gay .................... F24D 11/0221 62/235.1
3,996,759 A * 12/1976 Meckler ................ F25B 29/003 165/104.31
(Continued)

FOREIGN PATENT DOCUMENTS

EP 0031942 A1 7/1981
FR 2922634 A1 4/2009

OTHER PUBLICATIONS

International Search Report and Written Opinion, mailing date Sep. 12, 2023, issued on the corresponding PCT/CA2023/050802.

*Primary Examiner* — Claire E Rojohn, III
(74) *Attorney, Agent, or Firm* — NORTON ROSE FULBRIGHT CANADA LLP

(57) ABSTRACT

An energy storage system and method for operating same are provided. The system comprises a first heat exchanger for heating a first heat transfer fluid in fluid communication with a ground heat exchanger and a heat pump; and a first circulation device for circulating the first heat transfer fluid. An energy collector is in fluid communication with the first heat exchanger for transferring energy collected by an energy collector to the first heat exchanger with a second heat transfer fluid circulate by a second circulation device. A controller actuates the first and second circulation devices to circulate the first and second heat transfer fluids. If temperature sensor data of the first and second heat transfer fluids entering the first heat exchanger is above a threshold valve, the controller continues to actuate first and second circulation devices to circulate the first and second heat transfer fluids.

18 Claims, 16 Drawing Sheets

(51) Int. Cl.
*F24S 50/40* (2018.01)
*F24T 10/00* (2018.01)
*F24T 10/10* (2018.01)

(52) U.S. Cl.
CPC ...... *F24D 2200/11* (2013.01); *F24D 2200/12* (2013.01); *F24D 2200/14* (2013.01); *F24T 2010/56* (2018.05)

(58) Field of Classification Search
USPC ............................................................ 165/10
See application file for complete search history.

(56) References Cited

U.S. PATENT DOCUMENTS 4,042,012 A * 8/1977 Perry ...................... F24T 10/10 126/400
4,127,873 A * 11/1978 Katagi .................... G01S 7/064 342/185
4,137,898 A * 2/1979 Koizumi ............... F24D 11/007 126/609
4,158,291 A * 6/1979 Jones ...................... F25B 29/00 60/671
4,167,965 A * 9/1979 Rogers ................ F24D 11/0221 165/104.19
4,190,199 A * 2/1980 Cawley ............... F24D 11/0271 62/235.1
4,194,368 A * 3/1980 Bahel ...................... F24D 17/02 62/324.1
4,227,515 A * 10/1980 Jacob ................. G05D 23/1924 126/596
4,240,404 A * 12/1980 Franchina ........... F24D 11/0264 126/400
4,254,636 A * 3/1981 Zebuhr ................. F24F 5/0046 165/47
4,291,833 A * 9/1981 Franchina .......... G05D 23/1924 126/909
4,303,058 A * 12/1981 Chun .................... F24D 11/007 126/633
4,308,042 A * 12/1981 Ecker .................. F24D 11/0221 62/282
4,336,692 A * 6/1982 Ecker .................. F24D 11/0221 62/282
4,339,930 A * 7/1982 Kirts ....................... F25B 29/00 126/609
4,343,296 A * 8/1982 Franchina .......... G05D 23/1924 126/633
4,378,908 A * 4/1983 Wood .................. F24D 11/0221 62/235.1
4,402,190 A * 9/1983 Reid ....................... F25B 13/00 62/434
4,420,032 A * 12/1983 Van Koppen ......... F24D 11/003 126/400
4,425,906 A * 1/1984 Ingestrom ........... F24D 11/0264 126/633
4,429,545 A * 2/1984 Steinberg .............. F24S 10/753 62/235.1
4,438,881 A * 3/1984 Pendergrass ........ F24D 11/0221 62/235.1
4,527,618 A * 7/1985 Fyfe .................... F24D 11/0221 126/643
5,666,818 A * 9/1997 Manrique-Valadez ..................... F25B 33/00 62/235.1
5,685,152 A * 11/1997 Sterling .................. B60R 16/03 60/641.15
5,857,354 A * 1/1999 Ishiguro ................ F25B 39/026 62/484
7,621,140 B2 * 11/2009 Schnell ................... F24D 12/02 236/1 C
7,694,673 B2 * 4/2010 Brown, Jr. .............. F24S 90/00 62/235.1
7,848,853 B2 * 12/2010 Milder .................... F24D 12/02 700/277
8,041,462 B2 * 10/2011 Milder ............... G05D 23/1923 700/282
8,096,293 B2 * 1/2012 Hoellenriegel ..... F24D 11/0221 126/620
8,356,481 B2 * 1/2013 Penev ..................... F03G 6/067 60/641.15
8,387,687 B2 * 3/2013 Baer .................. H05K 7/20736 165/299
8,661,840 B2 * 3/2014 Isayama .............. F24D 19/1045 62/238.7
8,733,429 B2 * 5/2014 Harrison ................. F25B 30/06 62/235.1
9,016,079 B2 * 4/2015 Pedersen ............. F24D 11/0221 62/238.7
9,385,574 B1 * 7/2016 Xu ............................ B60L 1/20
9,702,597 B1 * 7/2017 El-Shaarawi ......... F25B 27/007
9,835,361 B2 * 12/2017 El-Shaarawi ........... F25B 41/28
10,254,019 B2 * 4/2019 Yoo .................... B60H 1/00907
10,393,094 B2 * 8/2019 Coventry ................ F03G 6/005
10,508,835 B2 * 12/2019 Ishiyama ................ F25B 39/00
11,262,096 B2 * 3/2022 Terraz ...................... F24F 11/84
11,262,108 B2 * 3/2022 Morimoto ............... F25B 13/00
11,303,244 B2 * 4/2022 Khayyat ................. F24S 10/95
11,619,404 B2 * 4/2023 Konyari .................... E04B 1/74 165/45
11,639,808 B2 * 5/2023 Koop ....................... F24F 11/63 700/277
11,747,049 B2 * 9/2023 Zaynulin ............. F24D 19/1045 165/45
12,287,101 B2 * 4/2025 Welch ...................... F24D 17/02
12,601,528 B2 * 4/2026 Zhao ...................... F25B 27/007
2007/0056304 A1 * 3/2007 Everett ................. F24F 5/0075 62/260
2009/0223509 A1 9/2009 Hoellenriegel et al.
2010/0192606 A1 8/2010 Isayama et al.
2011/0308268 A1 * 12/2011 Krimsky ................. F25B 30/06 62/260
2012/0103321 A1 * 5/2012 Coventry .................. F03G 6/04 126/584
2012/0125019 A1 * 5/2012 Sami ....................... F25B 30/06 62/235.1
2018/0372334 A1 * 12/2018 Walker ...................... F01K 3/18
2020/0340717 A1 * 10/2020 Qadir ..................... F24H 15/238
2021/0088227 A1 * 3/2021 Rosén ..................... F24D 10/00
2021/0293417 A1 * 9/2021 Rosenqvist ........... F24D 10/003
2025/0116436 A1 * 4/2025 Gao ........................ F24D 12/02
2025/0347427 A1 * 11/2025 Booy ....................... F24S 50/40

* cited by examiner

ENERGY STORAGE SYSTEM AND METHOD OF OPERATING SAME

CROSS REFERENCE TO RELATED APPLICATION AND CLAIM OF PRIORITY

The present application claims priority to U.S. provisional patent application No. 63/351,069 filed on Jun. 10, 2022, the entire contents of which are hereby incorporated by reference.

TECHNICAL FIELD

The disclosure relates generally to thermal heating, and more particularly to ground source heat pump heating systems and methods.

BACKGROUND

Heating dominant ground source heat pump systems can freeze the ground around and between the buried pipes, leading to system failure. Additionally, continuous operation during winter may cause inefficient operation of the ground source heat pump as the temperature of the buried pipes decreases over time due during continued operation. This may occur in cold climates when heat transfer fluid absorbs heat from the buried pipes at a greater rate than ground surrounding the buried pipes can transfer heat from the ground further away from the pipes. This may also occur in any climate where the heating load is significant in relation to the number of and spacing of the buried pipes. Freezing the ground around and between buried pipes of the ground source heat pump lowers the temperature of the fluid entering the heat pump to the level where the heat pump at the surface is unable to operate.

In summer, ground source heat pump systems can also overheat the ground around and between the buried pipes reducing heat transfer efficiency and potentially restrict use of the heat pump system.

SUMMARY

An improved energy storage system is desired.

In one aspect, the disclosure describes an energy storage system. The system comprising: a first heat exchanger for heating first heat transfer fluid in fluid communication with a ground heat exchanger and a heat pump, the first heat exchanger configured to receive the first heat transfer fluid from the heat pump and send the heat transfer fluid to the ground heat exchanger; a heat pump configured to receive the first heat transfer fluid from the ground heat exchanger, and send the first heat transfer fluid to the first heat exchanger. The heat pump has: a first mode of operation in which energy is received from a load and transferred to the first heat transfer fluid; and a second of operation in which energy is received from the first heat transfer fluid and transferred to the load. The system also comprises a first circulation device for circulating the first heat transfer fluid from the ground heat exchanger to the heat pump and the first heat exchanger, and to the ground heat exchanger, the first circulation device having: a third mode of operation in which the first heat transfer fluid is circulated from the ground heat exchanger to the heat pump, the first heat exchanger, and to the ground heat exchanger, and a fourth mode of operation in which the first circulation device stops circulating the first heat transfer fluid. The system also comprises an energy collector in fluid communication with the first heat exchanger for transferring energy collected by the energy collector to the first heat exchanger with a second heat transfer fluid, wherein a second circulation device is configured to circulate the second heat transfer fluid between the first heat exchanger and the energy collector, the second circulation device having: a fifth mode of operation in which the second heat transfer fluid is circulated from the energy collector to the first heat exchanger, and a sixth mode of operation in which the second circulation device stops circulating the second heat transfer fluid. A controller may be configured to: actuate the first circulation device to circulate the first heat transfer fluid in the third mode of operation; actuate the second circulation device to circulate second heat transfer fluid in the fifth mode of operation; receive data indicative $T_1$, $T_4$, and optionally $T_1$, $T_2$, $T_3$, $T_5$, and $T_6$, after a delay period communicate $T_1$, $T_4$, and optionally $T_2$, $T_3$, $T_4$, $T_5$, and/or $T_6$ to memory for storage; if $T_4$ is greater than $T_1$ by a first threshold margin, continue actuating the first and second circulation devices to circulate the first and second heat transfer fluids; if $T_4$ is greater than $T_1$ by less than a second threshold margin, actuate the first circulation device to operate in the fourth mode of operation, where:

$T_1$=temperature of the first heat transfer fluid entering the first heat exchanger;

$T_2$=temperature of the first heat transfer fluid leaving the first heat exchanger;

$T_3$=temperature of the first heat transfer fluid entering the heat pump;

$T_4$ is temperature of second heat transfer fluid at outlet of energy collector;

$T_5$ is temperature second heat transfer fluid leaving the first exchanger;

$T_6$=temperature of the second heat transfer fluid entering the first heat exchanger.

In an embodiment, the first threshold margin is a temperature in a range of 2-10° C. and the second threshold margin is less than the first threshold margin, preferably the second threshold margin is half of the first threshold margin.

In another embodiment, the delay period is in a range of 1 to 10 minutes, preferably 5 minutes.

In another embodiment, the controller is configured to: when operating in the third mode of operation and the fifth mode of operation: receive the data indicative of $T_1$, $T_2$, $T_3$, $T_4$, $T_5$, and/or $T_6$; calculate a coefficient of performance (COP); when the COP is greater than or equal to a performance threshold, continue actuating the first circulation device to operate in the third mode of operation and the second circulation device to operate in the fifth mode of operation; when the COP is less than the performance threshold, actuate the first circulation device to operate in the fourth mode of operation, and actuate the second circulation device to operate in the sixth mode of operation; wherein: COP=power through first heat exchanger/power consumption of the first and second circulation devices. In an example the performance threshold is greater than 1.

In another embodiment, the performance threshold is greater than 1.

In another embodiment, the controller is configured to: when $T_2$ or $T_3$ is greater than or equal to a first piping over-temperature threshold for a time period, actuate the second circulation device to operate in the sixth mode of operation, and when $T_2$ or $T_3$ is greater than a second piping over-temperature threshold, actuate the second circulation device to operate in the sixth mode of operation immediately, without a delay; wherein the first piping over-temperature threshold is a temperature value below a maximum allowable temperature rating of piping conveying the first heat transfer fluid, and the second piping over-temperature value is greater than the first piping over-temperature value. Optionally the second piping over-temperature value is about 5-10° C. below the maximum allowable temperature rating of piping, and optionally the first piping over-temperature value is about 10-20° C. below the maximum allowable temperature rating of piping. In an example, the maximum allowable temperature rating is in a range of 60-90° C.

In another embodiment, the controller is configured to: actuate the second circulation device to operate in the sixth mode of operation when $T_3$ is greater than a seasonal ground heat exchanger over-temperature threshold, wherein the seasonal ground heat exchanger over-temperature threshold is a temperature value greater than an expected modeled temperature for the day on which $T_3$ is received by the controller, and wherein the expected modeled temperature is calculated using at least one of the heat transfer between the load and heat pump, capacity ratings and size of the energy collector, ambient outdoor temperatures, and heat transfer characteristic of the ground and ground heat exchanger, optionally the seasonal ground heat exchanger over-temperature is in a range of about 1-10° C. greater than the expected modeled temperature.

In another embodiment, the first heat exchanger, the ground heat exchanger, and the heat pump define a first closed loop flow path.

In another embodiment, the first and second heat transfer fluids are any one of water, glycol, brine, mineral oil, and molten salts.

In another embodiment, the second heat transfer fluid may be circulated between the first heat exchanger and the energy collector with a second circulation device in a second closed loop flow path.

In another embodiment, the controller is configured to: when the first circulation device is actuated to the fourth mode of operation, wait for an energy soak period before actuating the first circulation device to operate in the third mode of operation.

Embodiments may include combinations of the above features.

In another aspect, the disclosure describes a method of operating an energy storage system. The method comprises receiving data indicative of $T_1$, $T_4$, and optionally $T_2$, $T_3$, $T_5$, and $T_6$, wherein: $T_1$=temperature of a first heat transfer fluid entering a first heat exchanger from a ground heat exchanger; $T_2$=temperature of the first heat transfer fluid leaving the first heat exchanger to a ground heat exchanger; $T_3$=temperature of the first heat transfer fluid entering a heat pump; $T_4$=temperature of a second heat transfer fluid at an outlet of an energy collector; $T_5$=temperature of the second heat transfer fluid leaving the first heat exchanger; $T_6$=temperature of a second heat transfer fluid entering the first heat exchanger from a energy collector. The method may also comprise: actuating a first circulation device to circulate the first heat transfer fluid between the first heat exchanger, ground heat exchanger, and the heat pump; actuating a second circulation device to circulate the second heat transfer fluid between the energy collector and the first heat exchanger; where the first and second heat transfer fluids are in thermal communication in the first heat exchanger. The method may also comprise: after a delay period, when $T_4$ is greater than $T_1$ by a first threshold margin, continue actuating the first circulation device to circulate the first and second heat transfer fluids, when $T_4$ is greater than $T_1$ by less than a second threshold margin, where the second offset threshold is less than the first offset threshold, actuate the first circulation device and the second circulation device to stop circulating the first and second heat transfer fluids.

In an embodiment, the method comprises: while actuating the first and second circulation devices to circulate the first and second heat transfer fluid: receive the data indicative of $T_1$, $T_2$, $T_3$, $T_4$, $T_5$, and $T_6$; calculate a coefficient of performance (COP); when the COP is greater than or equal to a performance threshold, actuate the first circulation device to circulate the first heat transfer fluid, and actuate the second circulation device to circulate the second heat transfer fluid; when the COP is less than the performance threshold, actuate the first circulation device to stop circulation of the first heat transfer fluid, and actuate the second circulation device to stop circulation of the second heat transfer fluid; wherein: COP=power through first heat exchanger/combined power consumption of the first and second circulation devices; and the performance threshold is greater than 1.

In another embodiment, the method comprises: receiving the data indicative of at least one of $T_2$ and $T_3$; when $T_2$ or $T_3$ is greater than or equal to a first piping over-temperature threshold for a time period, actuate the second circulation device to stop circulating the second heat transfer fluid, when $T_2$ or $T_3$ is greater than a second ground heat exchanger over-temperature threshold, actuate the second circulation device to stop circulating the second heat transfer fluid immediately; wherein the first piping over-temperature threshold is a temperature value below a maximum allowable temperature rating of piping conveying the first heat transfer fluid, and the second piping over-temperature value is greater than the first piping over-temperature value. Optionally the second piping over-temperature value is about 5-10° C. below the maximum allowable temperature rating of the piping, and optionally the first piping over-temperature value is about 10-20° C. below the maximum allowable temperature rating of the piping.

In another embodiment, the method comprises: receiving the data indicative of $T_3$; and actuating the first circulation device to operate in the fourth mode of operation to stop circulation of the first heat transfer fluid when $T_3$ is greater than a seasonal ground heat exchanger over-temperature threshold, where the seasonal ground heat exchanger over-temperature threshold is a temperature value greater than an expected modeled temperature for the day on which $T_3$ is received by the controller; where the expected modeled temperature is calculated using at least one of the heat transfer between the load and heat pump, capacity ratings and size of the energy collector, ambient outdoor temperatures, and heat transfer characteristic of the ground and ground heat exchanger, optionally the seasonal ground heat exchanger over-temperature is in a range of about 1-10° C. greater than the expected modeled temperature.

In another embodiment, the method comprises: when the first circulation device is actuated to stop circulating the first heat transfer fluid, wait for an energy soak period before actuating the first circulation device to circulate the first heat transfer fluid.

Embodiments may include combinations of the above features.

In a further aspect, the disclosure describes a computer program product for implementing control of energy transfer with an energy storage system, the computer program product comprising a non-transitory computer readable storage medium having program code embodied therewith, the program code readable/executable by a computer, processor or logic circuit to perform a method defined in this disclosure.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

Figure 1:
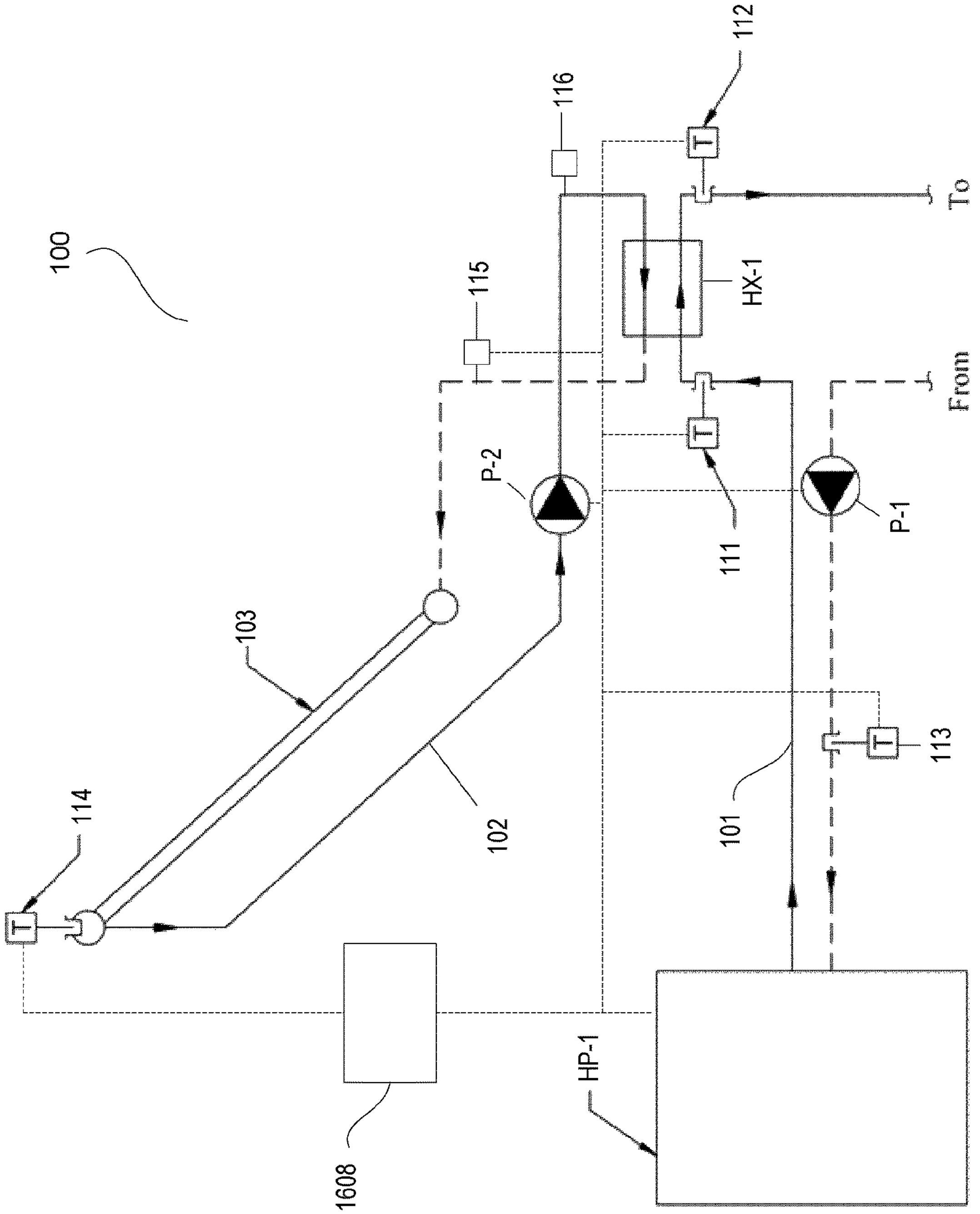
FIG. 1 shows a schematic view of an example energy storage system, in accordance with some embodiments.

Ground energy storage systems such as ground source heat pump systems having buried piping and may cause the ground and/or water surrounding the buried pipes to freeze as heat is drawn from the ground for distribution by the heat pump, e.g. to heat a building. Freezing of the ground and/or water surrounding a ground heat exchanger may occur in any climate where the heating load is significant in relation to the number of and spacing of the buried pipes. For example, where a constant heating load may be required at the heat pump, e.g. a heat pump coupled to a swimming pool, the load consistently draws more thermal energy from the ground surrounding the ground heat exchanger compared the thermal energy transferred into the ground surrounding the ground heat exchanger towards the pipes of the ground heat exchanger. Freezing the ground around and between buried pipes of the ground heat exchanger of a ground source heat pump may lower the temperature of the fluid entering the heat pump to a level where the heat pump at the surface is unable to operate as required to heat the load. When the ground and/or water freezes surrounding the buried pipes of a ground heat exchanger, heat may not be transferred to the heat transfer fluid within the pipe at a high enough temperature for heat pump operation, preventing the heat pump from operating as required. In an aspect, to mitigate against freezing of ground and/or water surrounding the buried pipes of the ground heat exchanger, an energy collector, such as a solar panel, may be coupled to a ground heat exchanger to collect energy and transfer that energy, e.g. in the form of heat, to the ground to prevent its freezing. In some examples, by allowing the system to run for a period of time, the ground heat exchanger temperature is shown to have gradually risen illustrating that ground surround the ground heat exchanger also rises. As such, it is contemplated that this type of system could be used in cold climates and/or highly heating dominant applications in warmer climates to reduce the cost and improve the efficiency of geo-exchange systems.

However, heating the ground may increase temperatures of the ground in the vicinity of the ground heat exchanger which may reduce thermal energy transfer efficiency and operation of the associated ground energy storage system as the heat transfer medium coming from the ground to the heat pump is too warm for continued operation of the heat pump, due to the incoming fluid temperature to the heat pump being above the maximum allowable amount specified by the heat pump manufacturer. Traditionally, ground source heat pump systems are designed based on a premise that the ground is an infinite heat sink, meaning that the ground will absorb and dissipate all thermal energy transferred to/from the ground heat exchanger. However, in some instances, the ground surrounding the piping of a ground heat exchanger may accumulate as excess of thermal energy from the energy collectors, which may increase temperature over time. In an example, soil types that are insulators (poor conductors), such a clay and/or dry sand, may accumulate energy from a ground heat exchanger and increase in temperature over time. Aspects of the systems and method according to this disclosure may address these issues.

System and method according to this disclosure may also be used to reduce the use of traditional heating system, e.g. electrical heating, natural gas furnaces, etc. resulting in reduced heating costs in cold environments, and reduction of dependency on fossil fuels or biomass for combustion. This may be particularly important for remote communities which may rely on diesel/propane that must be shipped over long distances. Use of systems and methods according to this disclosure may also reduce greenhouse gas emissions and make efficient energy storage systems more accessible to colder regions while reducing peak demand for electricity and natural gas, and increase heating system efficiencies.

Under certain conditions, which will be described below, the systems and methods according to this disclosure may inject energy, e.g. solar energy, into the ground to be stored seasonally for use by heat pumps during subsequent cold weather time periods. Efficiency of heat pumps may be increased, which may offset the cost of the ground heat exchanger. As the technology is used in higher latitudes (north and south), the combination of increased solar exposure during the summertime and colder ground temperatures during the wintertime makes the use of relatively inexpensive, un-glazed solar thermal panels highly effective for use in the systems described herein. Notably, the capacity and efficiency of solar thermal panels increases when the temperature of the water entering them decreases. Colder ground temperatures combined with high solar exposure in the summertime make the two technologies synergistic.

Definitions

Although terms such as “maximize”, “minimize” and “optimize” may be used in the present disclosure, it should be understood that such term may be used to refer to improvements, tuning and refinements which may not be strictly limited to maximal, minimal or optimal.

The term “connected” or “coupled to” may include both direct coupling (in which two elements that are coupled to each other contact each other) and indirect coupling (in which at least one additional element is located between the two elements).

The term “substantially” as used herein may be applied to modify any quantitative representation which could permissibly vary without resulting in a change in the basic function to which it is related.

Terms such as “up to”, “at least”, “greater than”, “less than”, “more than”, “or more”, and the like, include the number recited and such terms refer to ranges that can be subsequently broken down into sub-ranges. In the same manner, all ratios recited herein also include all sub-ratios falling within the broader ratio.

The singular forms “a,” “an,” and “the” include the plural reference unless the context clearly dictates otherwise. The term “and/or” means any one of the items, any combination of the items, or all of the items with which this term is associated.

The term “about” can refer to a variation of ±5%, ±10%, ±20%, or ±25% of the value specified. For example, “about 50” percent can in some embodiments carry a variation from 45 to 55 percent. For integer ranges, the term “about” can include one or two integers greater than and/or less than a recited integer at each end of the range. Unless indicated otherwise herein, the term “about” is intended to include values and ranges proximate to the recited range that are equivalent in terms of the functionality of the composition, or the embodiment.

Aspects of various embodiments are described through reference to the drawings.

FIG. 1 illustrates an example schematic view of an example energy storage system 100. In an aspect, system 100 comprises a first heat exchanger HX-1 for heating first heat transfer fluid 101 in fluid communication with a ground heat exchanger GHX and a heat pump HP-1. The heat transfer fluid may be defined by piping coupling heat pump HP-1, heat exchanger HX-1, and ground heat exchanger GHX in a closed loop system. In an embodiment, HX-1 may be a shell-and-tube heat exchanger, a plate heat exchanger, and/or a double pipe heat exchanger. In an embodiment, ground heat exchanger GHX may be a vertical ground heat exchanger, and/or horizontal ground heat exchanger. The first heat exchanger HX-1 may be configured to receive the first heat transfer fluid from heat pump HP-1 and send the heat transfer fluid to the ground heat exchanger GHX. Heat pump HP-1 may be configured to receive first heat transfer fluid 101 from ground heat exchanger GHX, and send the first heat transfer fluid 101 to the first heat exchanger HX-1. Heat pump HP-1 may be have a plurality of mode of operation which include: a first mode of operation in which energy is received from a load (not shown) and transferred to the first heat transfer fluid; and a second of operation in which energy is received from first heat transfer fluid 101 and transferred to the load. The load is, for example, a building or process, that discharges energy to the heat pump HP-1 in the first mode of operation or absorbs energy from the heat pump HP-1 in the second mode of operation. System 100 may comprises a first circulation device P-1, e.g. pump, for circulating first heat transfer fluid 101 from the ground heat exchanger GHX to heat pump HP-1 and first heat exchanger HX-1, and to the ground heat exchanger. First circulation device P-1 may have a plurality of modes of operation which may include: a third mode of operation in which circulation device P-1 circulates first heat transfer fluid 101 from ground heat exchanger GHX to heat pump HP-1, heat exchanger HX-1, and to ground heat exchanger GHX; and a fourth mode of operation in which first circulation device P-1 stops circulating the first heat transfer fluid 101. System 100 may also comprise an energy collector 103, e.g. at least one solar panel, in fluid communication with heat exchanger HX-1 for transferring energy collected by energy collector 103 to first heat exchanger HX-1 with a second heat transfer fluid 102. A second circulation device P-2 may be configured to circulate second heat transfer fluid 102 between heat exchanger HX-1 and energy collector 103. In an embodiment, second heat transfer fluid 102 is circulated between heat exchanger HX-1 and energy collector 103 in a closed loop flow path. Second circulation device 103 may comprise a plurality of modes of operation which may include: a fifth mode of operation in which second circulation device P-2 circulates the second heat transfer fluid 102 between energy collector 103 to heat exchanger HX-1; and a sixth mode of operation in which second circulation device P-2 stops circulating the second heat transfer fluid 102. In an embodiment, first and second fluid circulation devices may each be pumps.

System 100 may comprise a controller 1608 configured to operate system 100. In an aspect, controller 1608 may perform method 1500 illustrated in FIG. 15.

Figure 15:
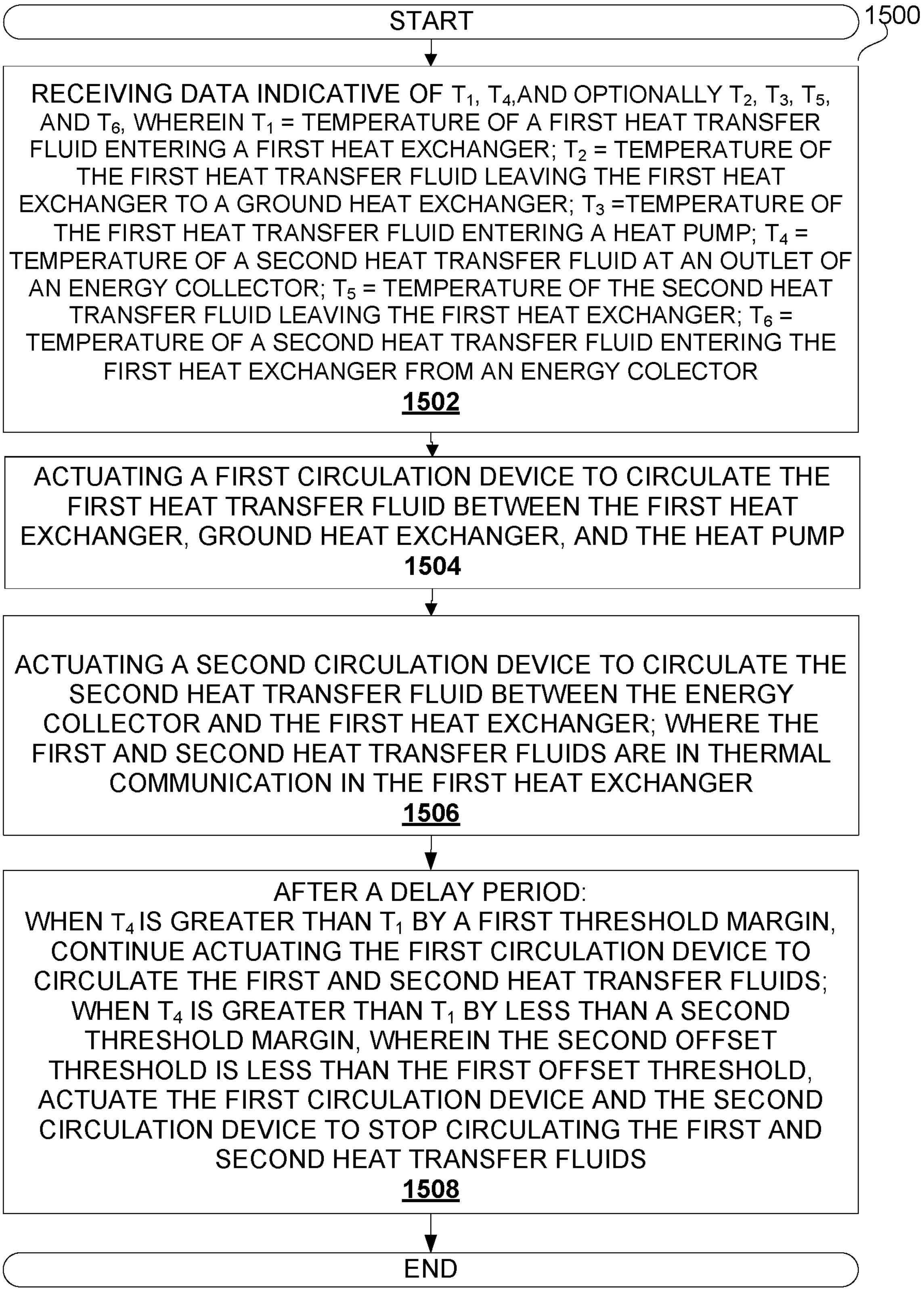
FIG. 15 shows a flowchart of an example of a method of operating an energy storage system, in accordance with some embodiments.

As illustrated in FIG. 15, at block 1502, controller 1608 may receive data indicative of at least one of $T_1$, $T_2$, $T_3$, $T_4$, $T_5$, and $T_6$ from temperature sensors 111, 112, 113, 114, 115, and 116 respectively. In the illustrated example $T_1$, $T_4$, and optionally $T_1$, $T_2$, $T_3$, $T_5$, and $T_6$ are received where:

$T_1$=temperature of first heat transfer fluid 101 entering a heat exchanger HX-1 from ground heat exchanger GHX;

$T_2$=temperature of the first heat transfer fluid leaving the first heat exchanger to a ground heat exchanger;

$T_3$=temperature of the first heat transfer fluid entering a heat pump;

$T_4$=temperature of a second heat transfer fluid at an outlet of an energy collector;

$T_5$=temperature of the second heat transfer fluid leaving the first heat exchanger;

$T_6$=temperature of a second heat transfer fluid entering the first heat exchanger from a energy collector;

At block 1504, controller 1608 may actuate first circulation device P-1 to circulate the heat transfer fluid 101 in the third mode of operation; and at block 1506 controller 1608 may actuate second circulation device P-2 to circulate second heat transfer fluid 102 in the fifth mode of operation, such that heat transfer fluid 101 may circulate between heat pump HP-1, heat exchanger HX-1, and ground heat exchanger GHX; and heat transfer fluid 102 circulates between energy collector 103 and heat exchanger HX-1. Thermal energy transfer may occur across heat exchanger HX-1 if there is a temperature difference between the heater transfer fluids 101, 102.

At block 1508, controller 1608 may receive data indicative of $T_1$, $T_2$, $T_3$, $T_4$, $T_5$, $T_6$ and after a delay period communicate $T_1$, $T_2$, $T_3$, $T_4$, $T_5$, and/or $T_6$ to memory for storage. The method, e.g. a subroutine for controller 1608, for the delay period is described below with respect to FIGS. 4, 5, 11, 12, and 13. In an embodiment, the delay period may be in a range of 1 to 20 minutes, preferably about 5 minutes, to allow temperatures to stabilize through the system. The delay period may also improve the temperature reading of $T_1$ because after a period where heat transfer fluid 101 is stationary, e.g. when energy circulation device P-1 is stopped, the temperature of heat transfer fluid at 114 will transition to ambient temperature. As such, the delay period allows accurate readings of $T_1$ to be obtained. Continuing the example, if $T_4$ is greater than $T_1$ by a first threshold margin, controller 1608 continues actuating the first and second circulation devices P-1, P-2 to circulate the first and second heat transfer fluids 101, 102 respectively. When the first and second circulation devices are actuated, a “Solar Mode” as referred to herein is activated or “On”. When one of, or both, first and second circulation devices P-1, P-2 are stopped then Solar Mode is deactivated “off”. Heat pump HP-1 may be on or off while Solar Mode is on, and the heat pump can be operating the first or second modes of operation, i.e heat pump may be heating or cooling a load. If $T_4$ is greater than $T_1$ by less than a second threshold margin, controller 1608 actuates circulation device P-1 to operate in the fourth mode of operation such that circulation of heat transfer fluid 101 stops. In an embodiment, the first threshold margin is a temperature in a range of 2-10° C. and the second threshold margin is less than the first threshold margin, preferably the second threshold margin is half of the first threshold margin. The first threshold margin may be used to confirm that sufficient energy may be transferred from the energy collector to the first heat transfer fluid which improves energy efficiencies of the system by minimizing energy loss by running energy circulation devices.

Heat transfer fluids 101, 102 may be any material or substance for conveying thermal energy. In an embodiment, the first and second heat transfer fluids are any one of water, glycol, brine, mineral oil, and molten salts.

Figure 2:
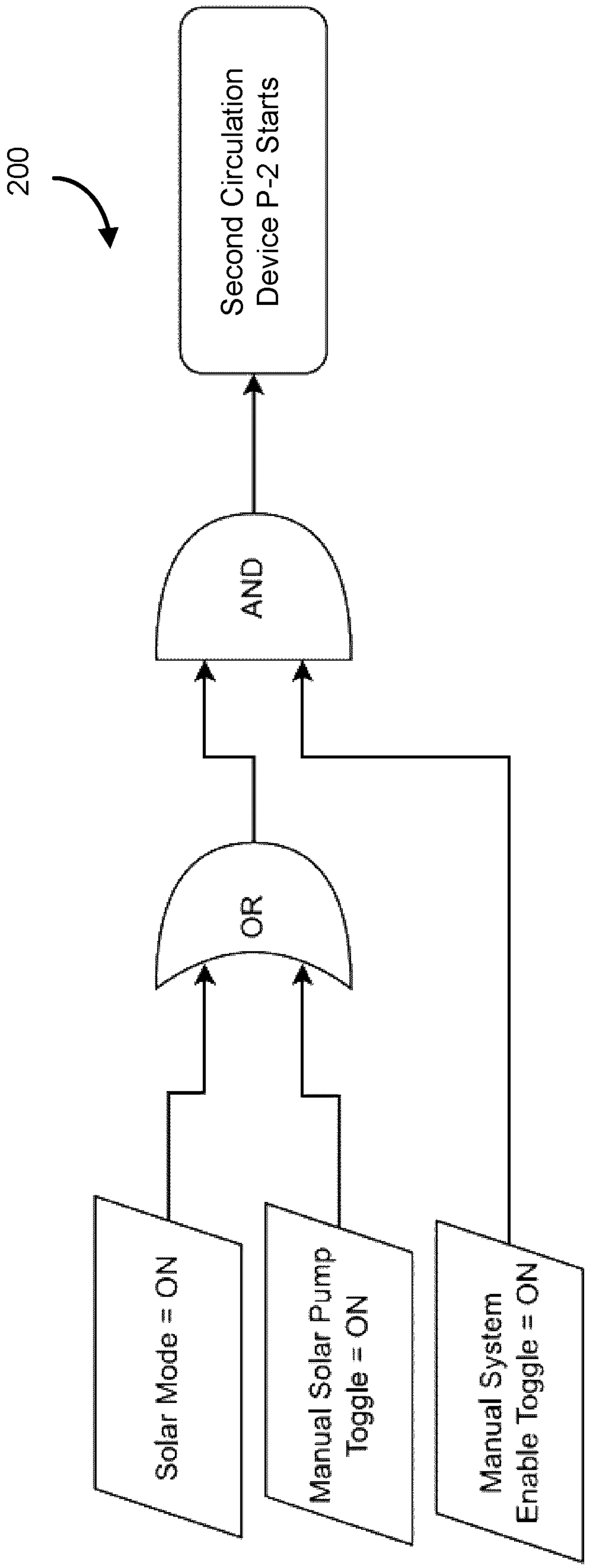
FIG. 2 shows a flowchart of an example method for starting a flow circulation device associated with an energy collector of the system of FIG. 1.

FIG. 2 shows a flowchart of a example method 200 for starting a flow circulation device associated with an energy collector of system 100. The illustrated method(s), also referred to herein as a subroutine(s), may turn on second circulation device P-2 when system is on and either solar mode is on or a user wants to manually activate the second circulation device P-2. The controller may loop through this method every time system 100 starts-up.

Figure 3:
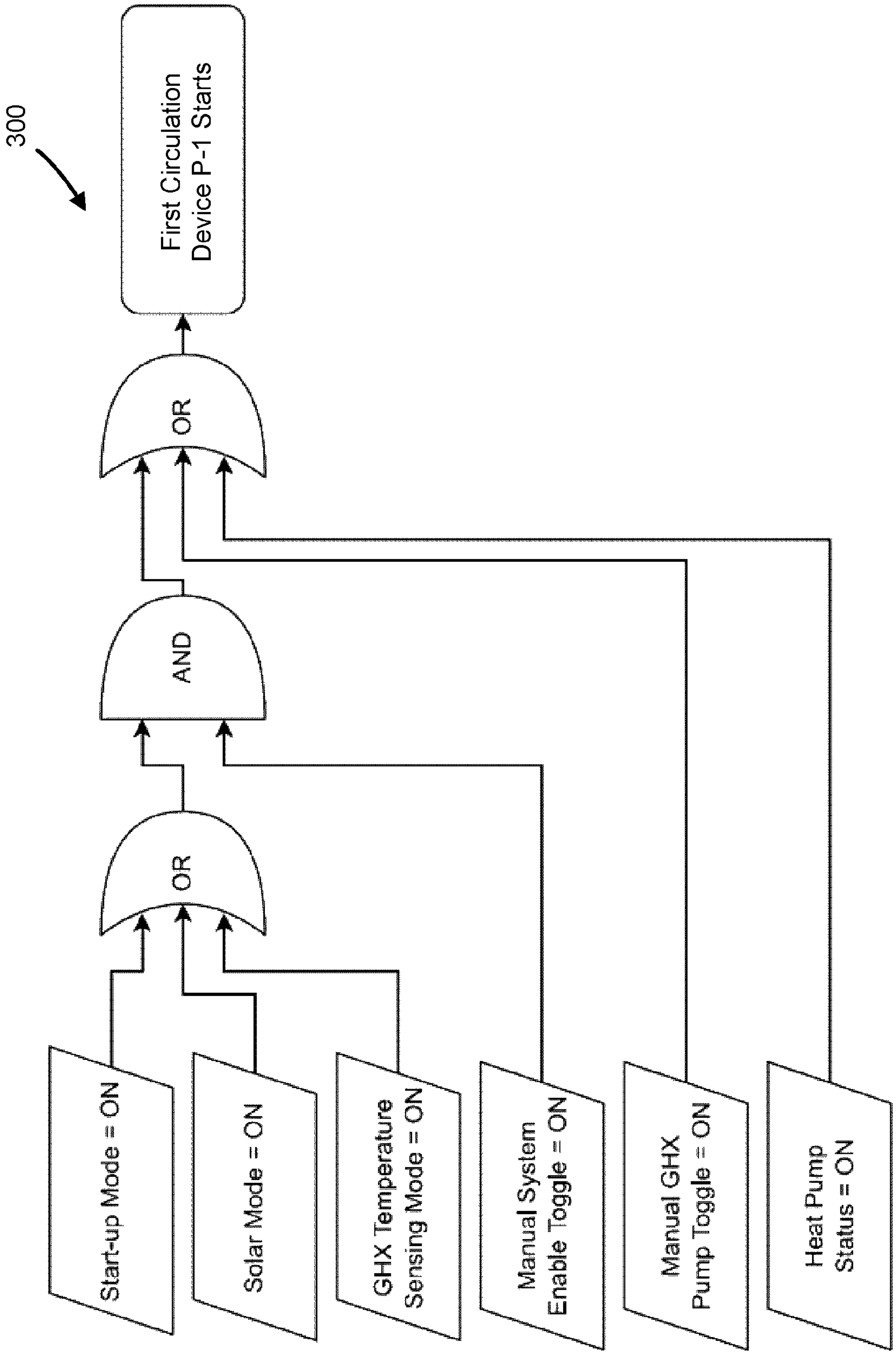
FIG. 3 shows a flowchart of an example method for starting a flow circulation device associated with a ground heat exchanger of the system of FIG. 1.

FIG. 3 shows a flowchart of an example method 300 for starting a flow circulation device associated with a ground heat exchanger of system 100. The illustrated method may turn on the first circulation device P-1. If system 100 is starting up, Solar Mode is on, or GHX temperature sensing mode is on (i.e. the controller is directed to gather temperature measurements for $T_1$, or $T_3$), and the system is manually enabled, the first circulation device P-1 will turn on. First circulation device P-1 may also turn on to serve heat pump HP-1 when the heat pump is operating, or if first circulation device P-1 is manually turned on, i.e. GHX pump toggle is turned on. Controller 1608 may loops through this method when system 100 starts-up.

Figure 4:
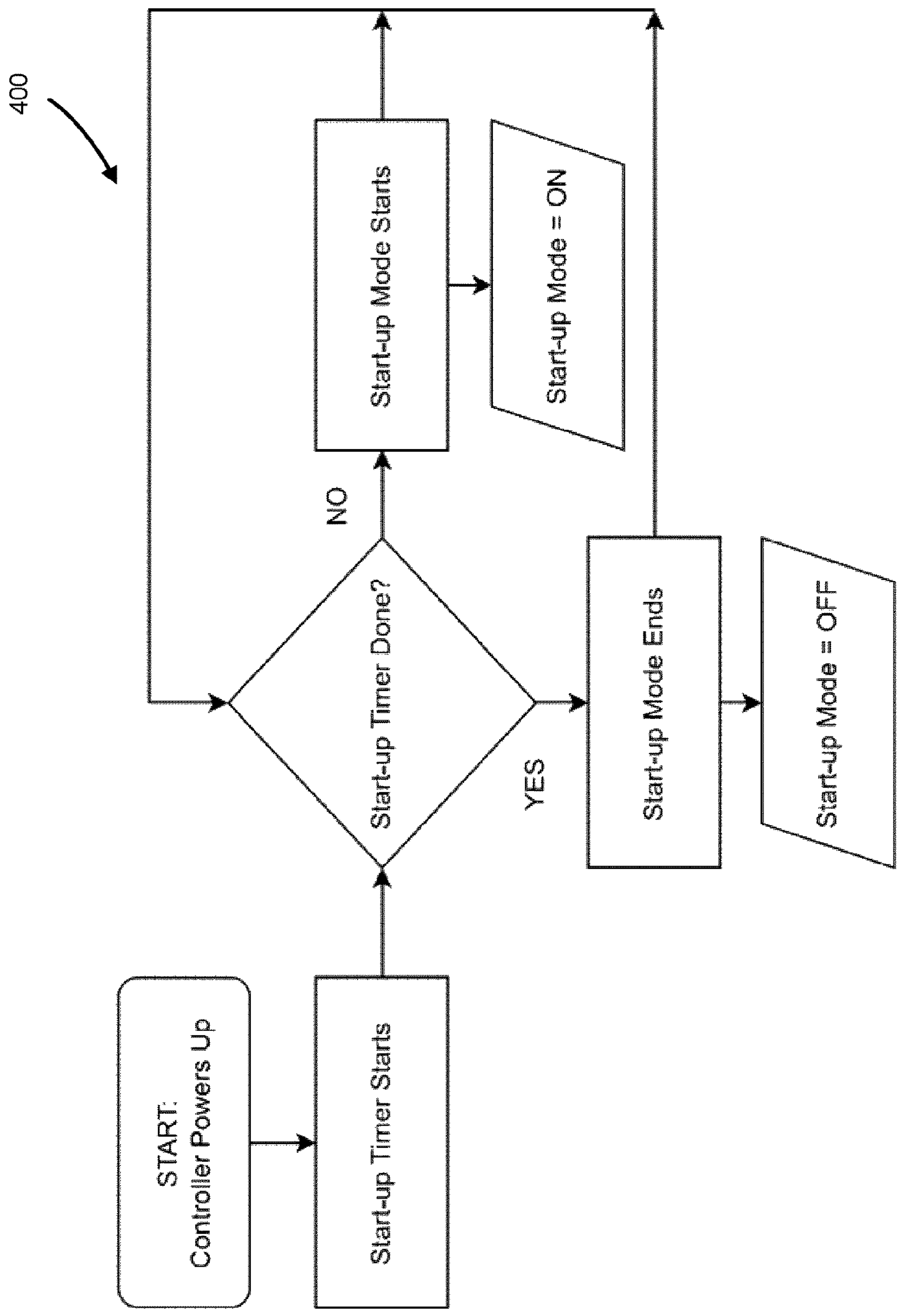
FIG. 4 shows a flowchart of an example method for sensing the temperature of the ground heat exchanger when starting the system of FIG. 1.

FIG. 4 shows a flowchart of an example method 400 for sensing the temperature of the ground heat exchanger when starting system 100. This method may allow controller 1608 to compare the solar panel temperature $T_4$ to the temperature of the heat transfer fluid entering heat exchanger HX-1 to determine if solar Mode should be on or not. Controller 1608 may initiate this method when system 100 starts-up. As shown, a start-up timer begins when system 100 starts-up creating a delay period after which a Start-up Mode ends. After the start-up timer finishes, the timer may never be reset until system 100 shuts down. The timer may be set to create a delay period of 1 to 10 minutes. In an example, the delay period is about 5 minutes. The delay period may allow temperatures throughout system 100 to stabilize so that accurate and reliable temperature data can be obtained from sensors 111-116.

Figure 5:
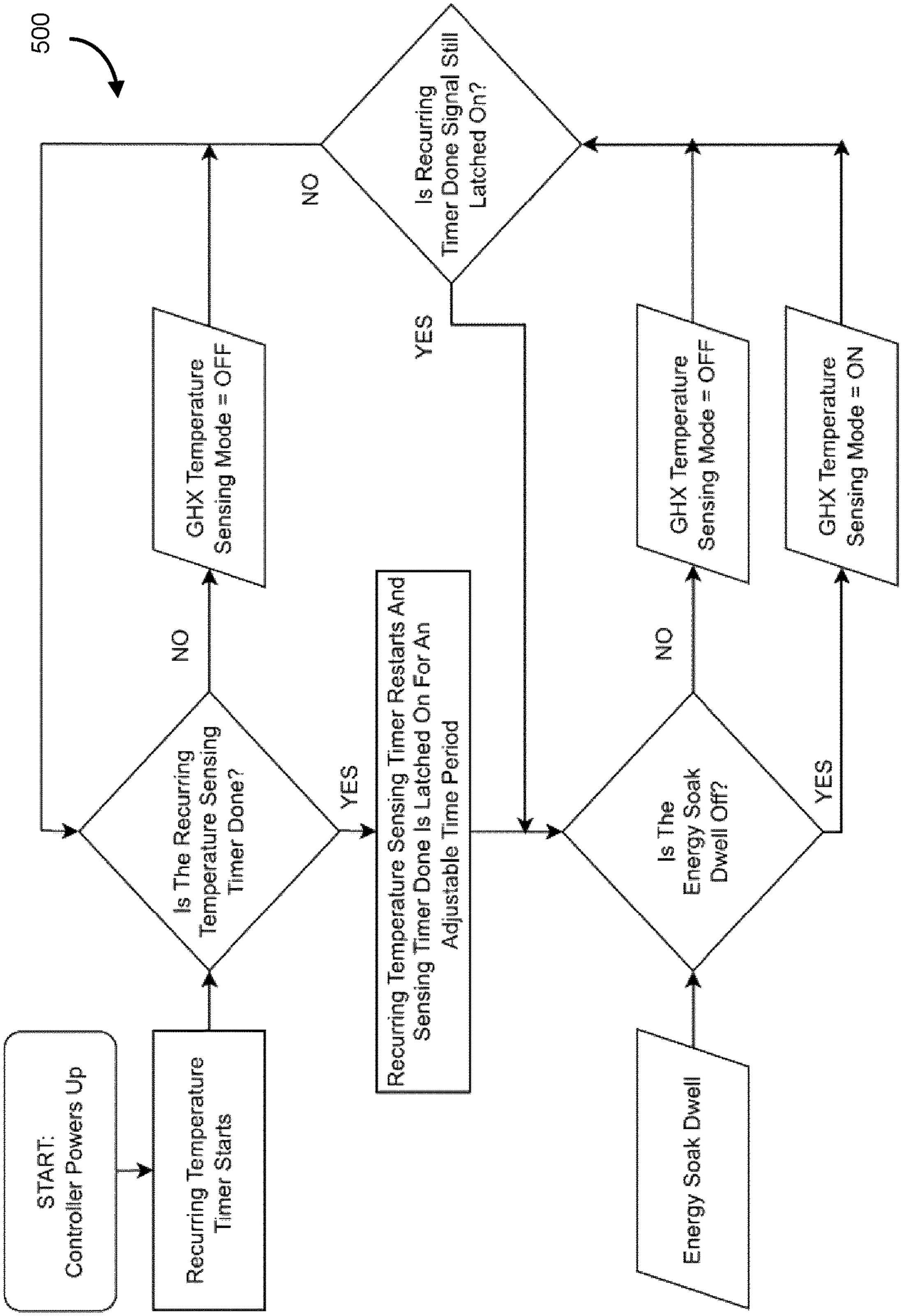
FIG. 5 shows a flowchart of an example method for intermittent, recurring temperature sensing with the system of FIG. 1.

FIG. 5 shows a flowchart of an example method 500 for intermittent, recurring temperature sensing with system 100. This method may sense the temperature of the ground heat exchanger GHX, e.g. at $T_1$ and/or $T_3$, after an time interval, and/or multiple reoccurring time intervals, set by a temperature timer, by circulating the heat transfer fluid 101 through the ground heat exchanger GHX to provide temperature $T_1$, $T_3$ of the heat transfer fluid 101 coming from ground heat exchanger GHX so controller 1608 can compare that temperature to the energy collector temperature $T_4$, to see if energy can be extracted from the energy collector 103, e.g. solar panels, and stored in the ground. This method may maximize use of the energy collector 103, e.g. solar panel(s), because the ground next to pipes of the ground heat exchanger GHX may start to cool down as soon as energy stops being transferred to the GHX. Energy Soak Dwell input is described in more detail below with respect to FIG. 14. Controller 1608 may initiate method 500 when system 100 starts-up.

Figure 6:
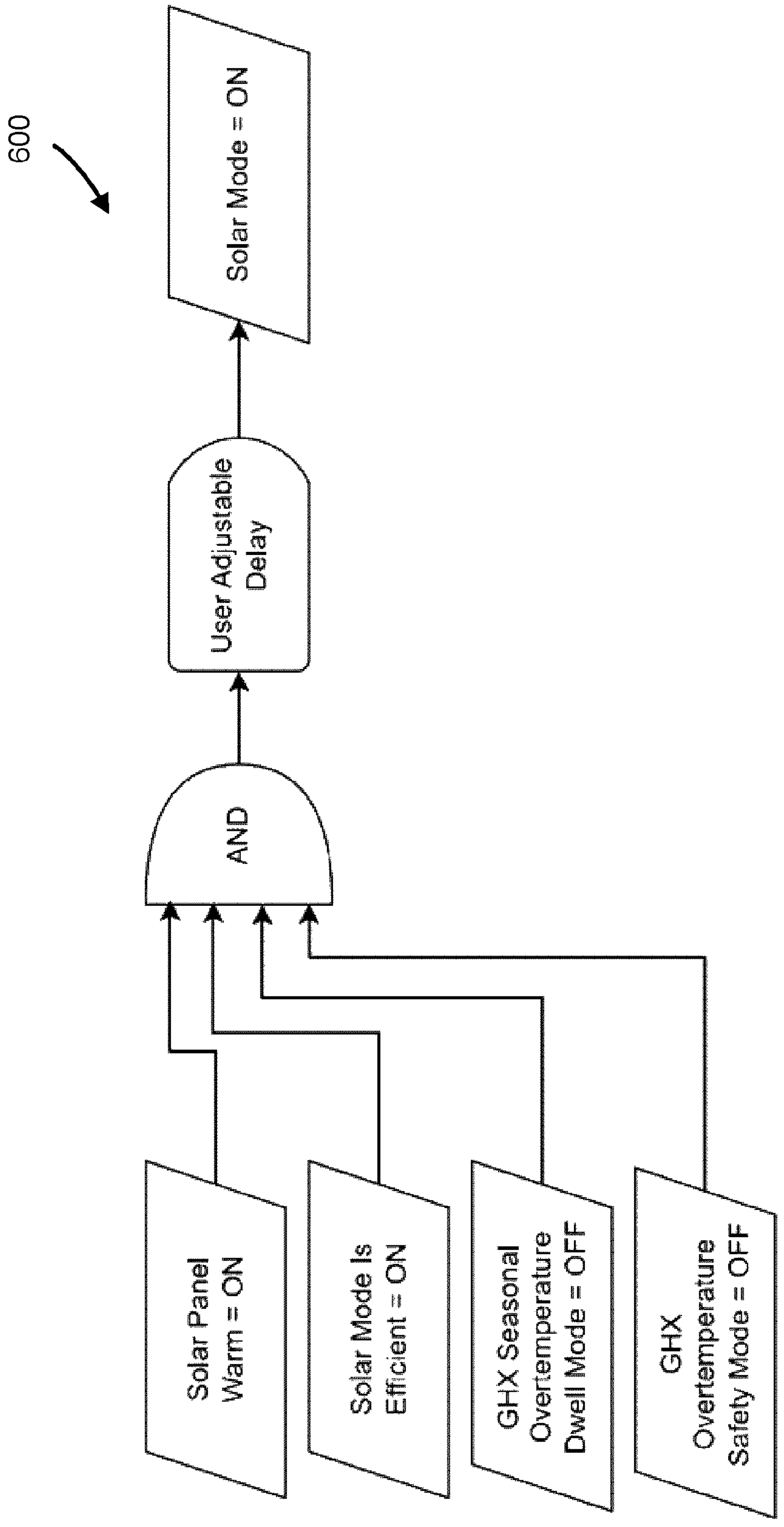
FIG. 6 shows a flowchart of an example method for initiating a solar mode to convey energy to the ground with the system of FIG. 1.

FIG. 6 shows a flowchart of an example method 600 for initiating “Solar Mode” to convey energy to the ground surrounding the ground heat exchanger GHX with the system of system 100. This method may turn on the first circulation device P-1 and second circulation device P-2 if the temperature of the heat transfer fluid 102 coming from the energy collector 103, e.g. solar panels, is warmer than the latest known temperature of the heat transfer fluid coming from the ground heat exchanger GHX, i.e. $T_1$. As described below with respect to FIG. 8, to continue Solar Mode may also required the thermal energy delivered into ground heat exchanger GHX to be larger than the power consumed by the first and second circulation devices P-1, P-2. Further, to continue Solar Mode, ground heat exchanger GHX may need to be under the seasonal temperature threshold or instantaneous temperature threshold as described below with respect to FIGS. 9 and 10 respectively. A delay period may be implemented before initiating Solar Mode so that temperatures within system 100 may stabilize. Controller 1608 may initiate this method when system 100 starts-up.

Figure 7:
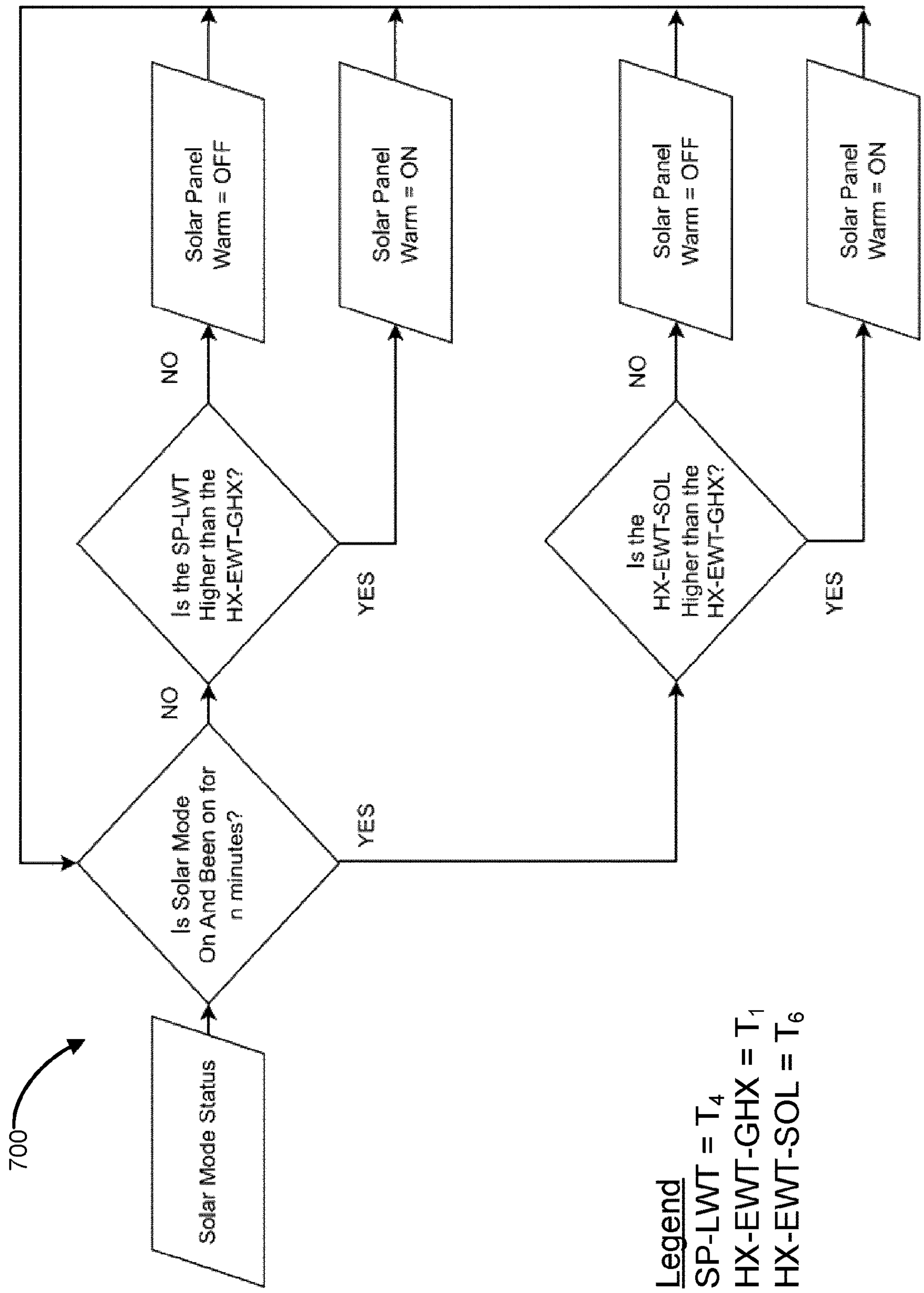
FIG. 7 shows a flowchart of an example method for temperature sensing of energy collector and ground heat exchanger temperatures of the system of FIG. 1.

FIG. 7 shows a flowchart of an example method 700 for temperature sensing of energy collector and ground heat exchanger temperatures of system 100. This method may compare temperature $T_4$ of heat transfer fluid 102 existing energy collector 103, e.g. solar panel(s), at an outlet before it conveyed to heat exchanger HX-1, to the latest known temperature $T_1$ of the heat transfer fluid entering heat exchanger HX-1. After Solar Mode has been on for a time interval, e.g. n minutes where n may be in a range of 1-20 minutes, the temperature $T_1$ of heat transfer fluid 102 entering heat exchanger HX-1 is instead compared to temperature $T_6$ because energy can be lost or gained from/to the piping between the energy collector 103 and heat exchanger HX-1. As shown in the legend of FIG. 7, SP-LWT is the temperature $T_4$ of heat transfer fluid 102 leaving energy collector 103; HX-EWT-GHX is the temperature $T_1$ of the heat transfer fluid 101 coming into heat exchanger HX-1; and HX-EWT-SOL is the temperature $T_6$ of heat transfer fluid 102 entering heat exchanger HX-1 after the solar pump has been on for n minutes (where n is an adjustable time, e.g. 1-20 minutes) so the controller compares an inlet temperature to heat exchanger HX-1, factoring energy losses or gains from/to the piping between the energy collector 103 and heat exchanger HX-1.

Figure 8:
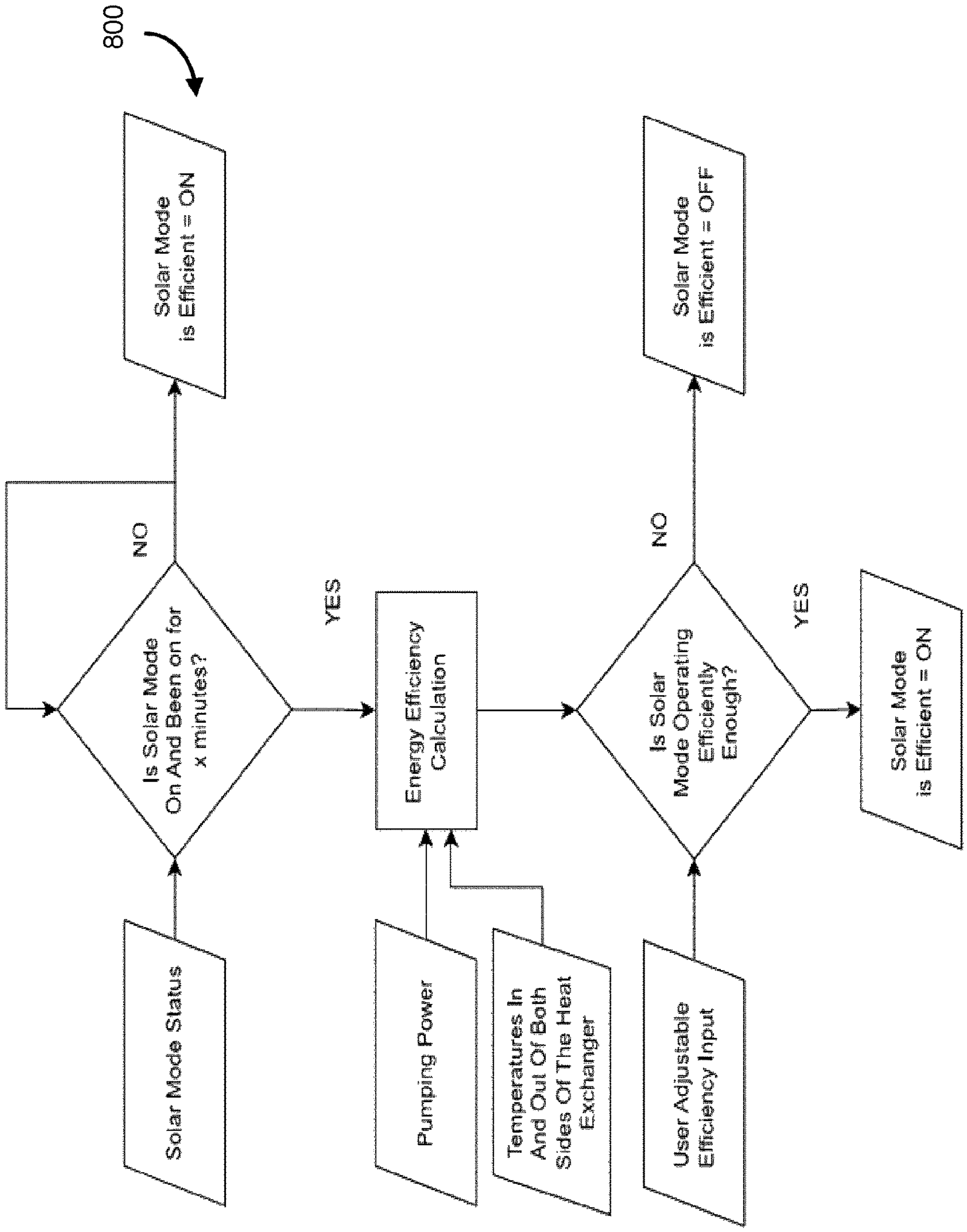
FIG. 8 shows a flowchart of an example method for determining energy efficiency for the system of FIG. 1.

FIG. 8 shows a flowchart of an example method 800 for determining energy efficiency of system 100. This method may check if the thermal power delivered to ground heat exchange GHX is sufficiently larger than the power consumption of the circulation devices P-1, P-2. A user may adjust the efficiency threshold to account for their cost of electricity and need to gather energy from energy collector 103. In an embodiment, when operating in the third mode of operation and the fifth mode of operation for circulation devices P-1, P-2, i.e. heat transfer fluid 101, 102 is being circulated, controller 1608 may be configured to: receive the data indicative of $T_1$, $T_2$, $T_3$, $T_4$, $T_5$, and/or $T_6$; calculate a coefficient of performance (COP); and when the COP is greater than or equal to a performance threshold, continue actuating the first circulation device to operate in the third mode of operation and the second circulation device to operate in the fifth mode of operation. When the COP is less than the performance threshold, controller 1608 may acute the first circulation device to operate in the fourth mode of operation, and the second circulation device to operate in the sixth mode of operation, i.e. circulation devices P-1, P-2 are shut off. In an example, COP may be the power through heat exchanger HX-1 divided by a power consumption of the first and second circulation devices P-1, P-2. Power consumption may be calculated based on energy consumption, e.g. electricity consumption, of circulation devices P-1, P-2. Power through heat exchanger HX-1 may be determined based on the temperatures across heat exchanger HX-1 and flow rates of heat transfer fluids 101, 102. The performance threshold selected by a user may be a value greater than one, e.g. 2, 3, etc. such that more power is passing through heat exchanger HX-1 than is consumed by circulation devices P-1, P-2. The variable x minutes is an adjustable time limit, e.g. a delay period in a range of 1-20 minutes, in an example about 5 minutes, to allow system 100 to start up before invoking the calculation of COP.

Figure 9:
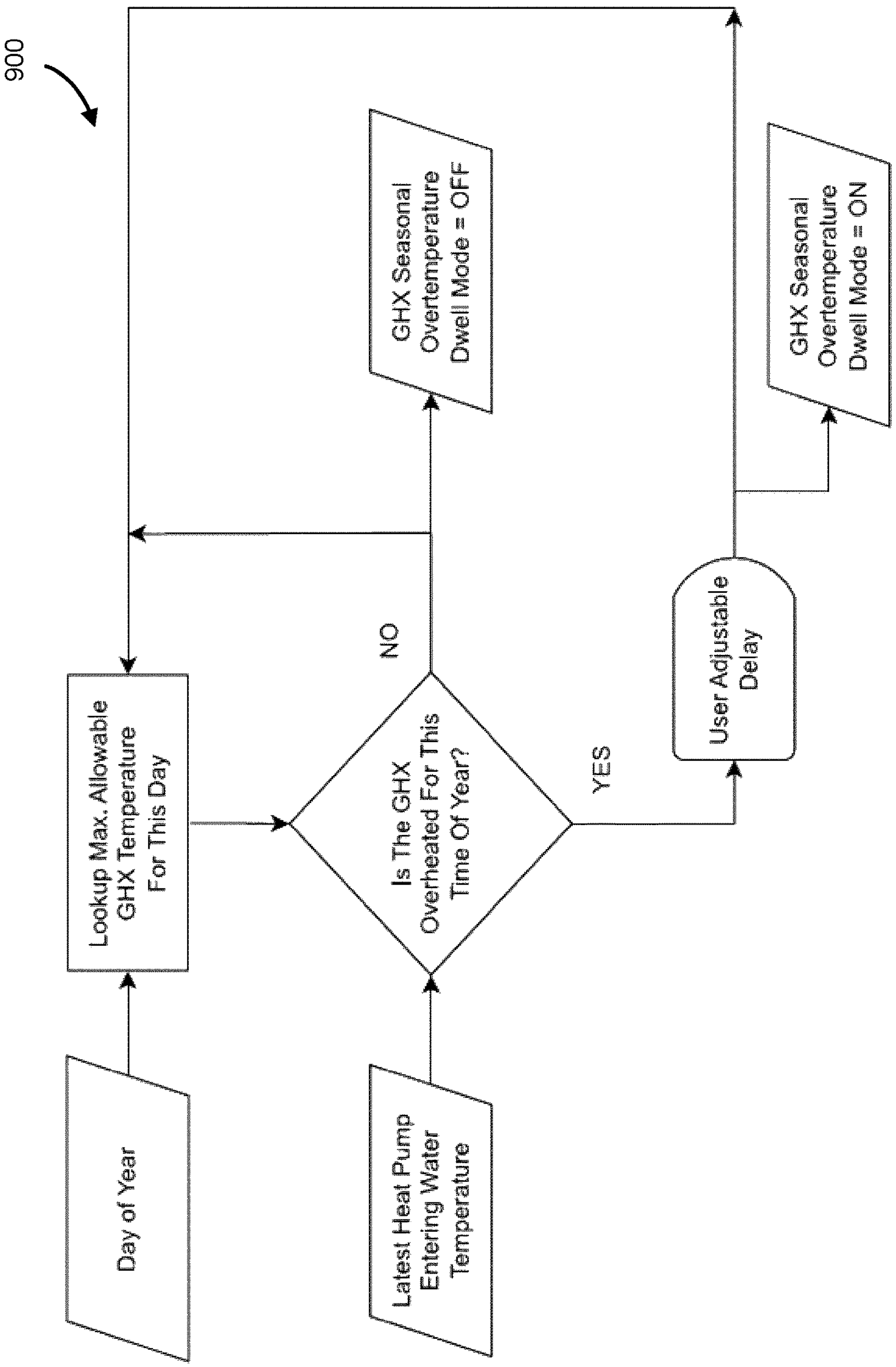
FIG. 9 shows a flowchart of an example method for checking if a ground heat exchanger seasonal over-temperature threshold has been reached for the system of FIG. 1.

FIG. 9 shows a flowchart of an example method 900 for checking if a ground heat exchanger seasonal over-temperature threshold has been reached for system 100. This method may compare the temperature of the heat transfer fluid coming from the ground heat exchanger GHX, i.e. $T_1$, and/or $T_3$ to a seasonal ground heat exchanger over-temperature threshold to limit the amount of energy input into the ground. For example, the seasonal ground heat exchanger over-temperature threshold may limit heat transfer early in the summer to prevent the ground from overheating later in the summer which may then cause the cooling function of the heat pump to be compromised. Additionally, the seasonal ground heat exchanger over-temperature threshold may limit the amount of thermal energy input into the ground in order to prevent overheating and dehydration of the ground which may decrease the heat capacity and conductivity of the ground near the ground heat exchanger GHX.

In an example, the seasonal ground heat exchanger over-temperature threshold may be determined based on an expected model temperature. The expected model temperature may be determined by generating heating and cooling loads, e.g. for every hour of the year, based on heat pump energy requirements, dimensions and materials of system 100, heat transfer characteristic of the ground and ground heat exchanger, and the ambient outdoor temperatures. These heating and cooling loads may be used to design and size the ground heat exchanger GHX. In an example, the system 100 including ground heat exchanger GHX and energy collectors 103 may be sized and designs using program GLD Software™ provided by Thermal Dynamics. Based on the design of the ground heat exchanger GHX, a theoretical annual temperature profile of ground temperature, and/or temperature of a heat transfer fluid leaving the ground heat exchanger GHX may be estimated for each day and/or month. Because controller 1608 may evaluate if measured temperature of the heat transfer fluid leaving the ground heat exchanger, e.g. $T_1$, $T_3$, is greater than the expected theoretical temperature model by a seasonal ground heat exchanger over-temperature threshold, controller 1608 may prevent excessive heat build up in the ground around ground heat exchanger GHX. This may mitigate against over heating the ground which may compromise heat pump HP-1 performance later due to the ground being unable to transfer thermal energy away at a rate to prevent heat accumulation. Preventing excessive heat build up in the ground may also mitigate against dehydration of the ground which reduces the ground heat capacity and conductivity; ultimately impacting the performance of heat pump HP-1 because heat transfer fluid 101 is hotter and unable to absorb as much thermal energy from the heat pump HP-1.

In an embodiment, controller 1608 may be configured to actuate second circulation device P-2 to operate in the sixth mode of operation, to stop circulation heat transfer fluid 102, when $T_3$ is greater than a seasonal ground heat exchanger over-temperature threshold. The seasonal ground heat exchanger over-temperature threshold may be a temperature value greater than an expected modeled temperature for the day on which $T_3$ is received by controller 1608. The expected modeled temperature may be calculated using at least one of the heat transfer between the load and heat pump HP-1, capacity ratings and size of the energy collector, ambient outdoor temperatures, and heat transfer characteristic of the ground and ground heat exchanger. In an example, the seasonal ground heat exchanger over-temperature is in a range of about 1-10° C. greater than the expected modeled temperature.

Figure 10:
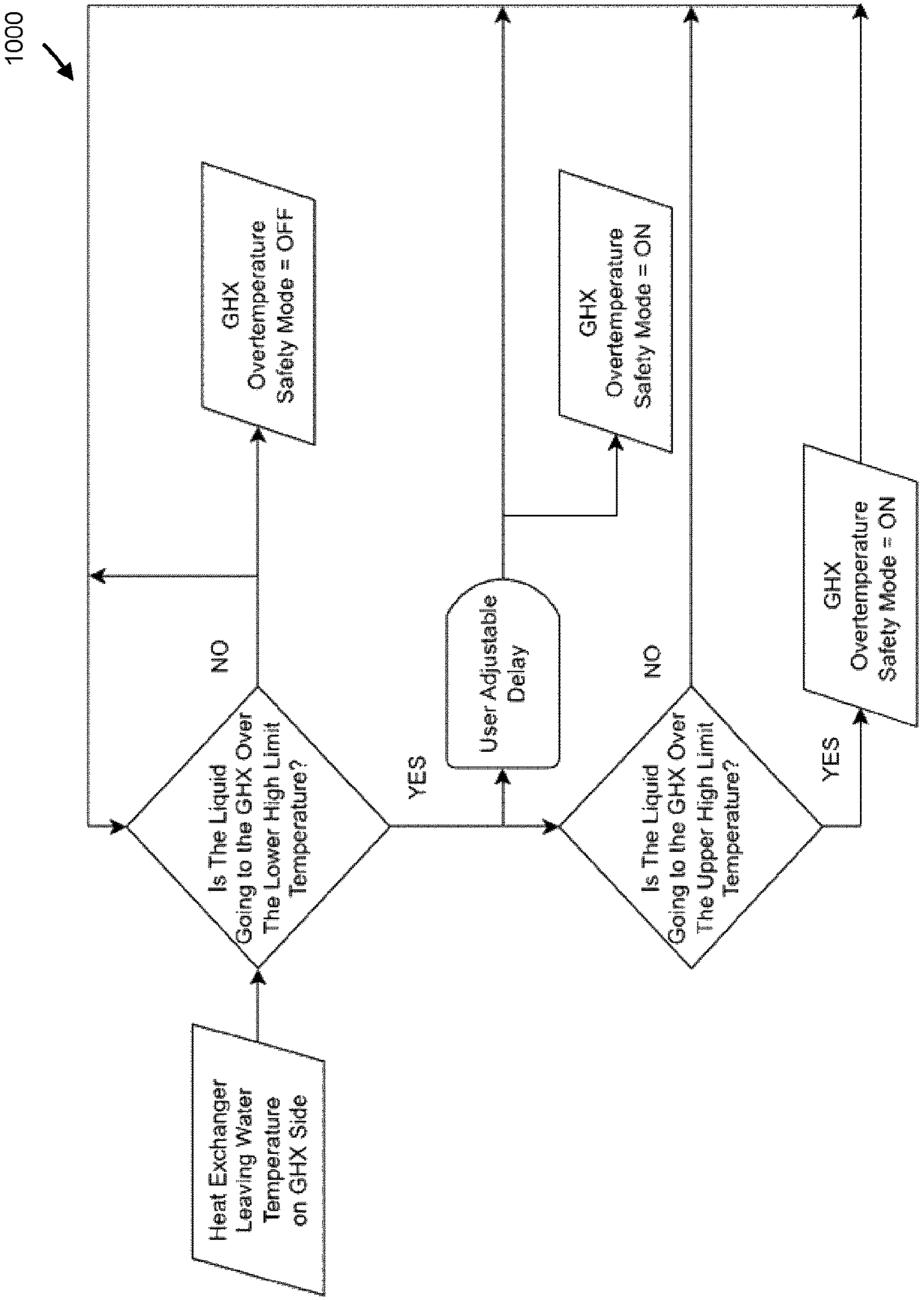
FIG. 10 shows a flowchart of an example method for checking if high temperature limit(s) have been reached for the system of FIG. 1.

FIG. 10 shows a flowchart of an example method 1000 for checking if high temperature limit(s) have been reached for system 100. This method may compare the temperature of heat transfer fluid 101 coming from heat exchanger HX-1 to ground heat exchanger GHX to a lower high limit and an upper high limit. The lower high limit may causes Solar Mode to stop after a delay, whereas the upper high limit may causes Solar Mode to stop immediately. This method for checking high temperature limit(s) may prevent ground heat exchanger GHX from being damaged by heat transfer fluid that is too hot for the material of the GHX and/or piping conveying heat transfer fluid 102.

In an embodiment, when $T_2$ is greater than or equal to a first piping over-temperature threshold for a time period, controller 1608 may actuate second circulation device P-2 to operate in the sixth mode of operation, i.e. actuate second circulation device P-2 to stop. When $T_2$ is greater than a second ground heat exchanger over-temperature threshold, controller 1608 may actuate the second circulation device to operate in the sixth mode of operation immediately, without a delay. The first piping over-temperature threshold may be a temperature value below a maximum allowable temperature rating of piping conveying the first heat transfer fluid, and the second piping over-temperature value may be greater than the first piping over-temperature value. In an example, the second piping over-temperature value is about 5-10° C. below the maximum allowable temperature rating of piping. The first piping over-temperature value may be about 10-20° C. below the maximum allowable temperature rating of piping. In an embodiment, the maximum allowable temperature rating is in a range of about 50-100° C. Non-limiting example piping materials include, high density poly ethylene (HDPE) which may have a maximum allowable temperature rating of about 86° C.; and Poly Vinyl Chloride (PVC) may have a maximum allowable temperature rating of about 50-90° C.

Figure 11:
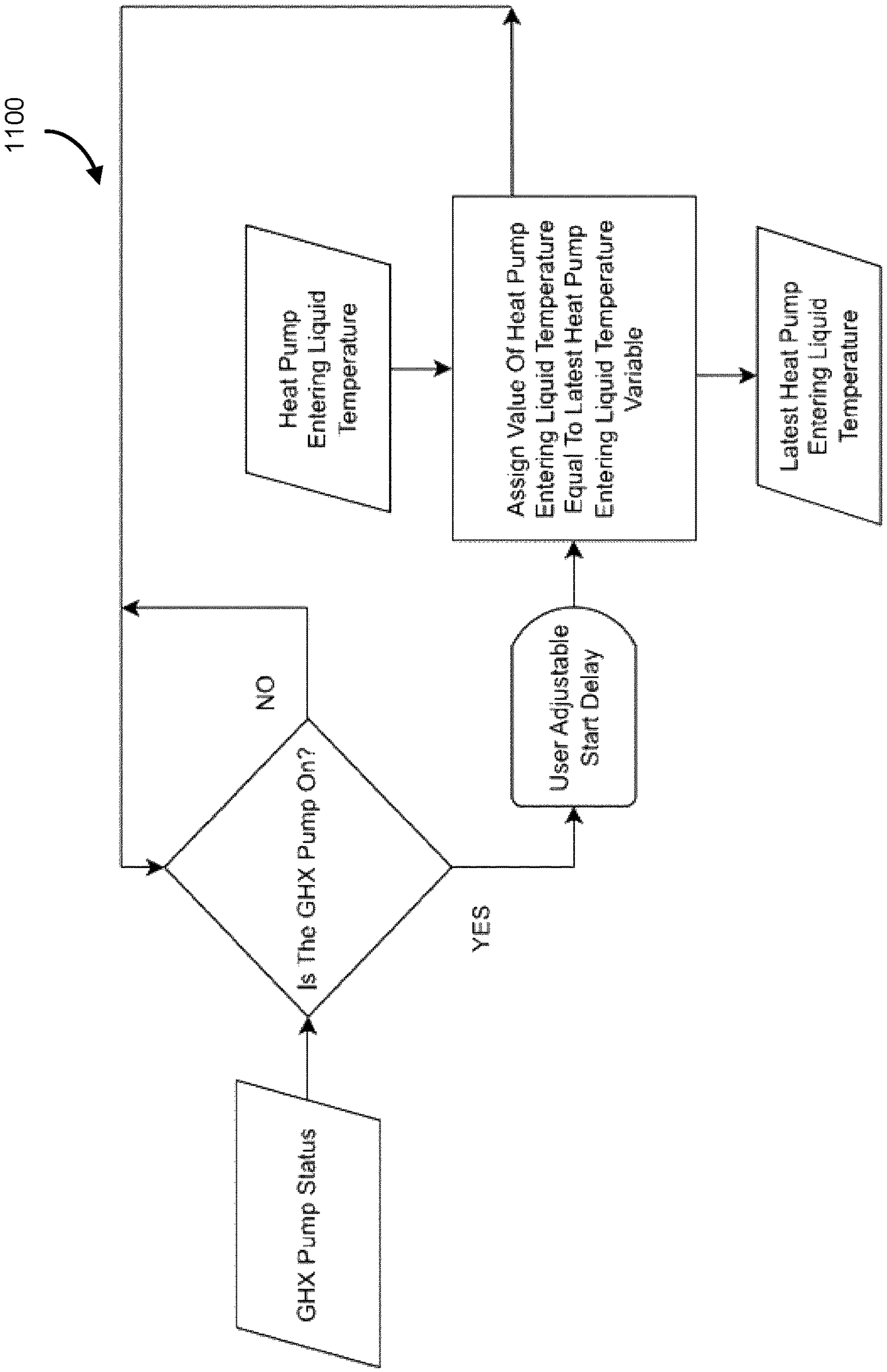
FIG. 11 shows a flowchart of an example method for updating a temperature of heating transfer fluid entering the heat pump of the system of FIG. 1.

FIG. 11 shows a flowchart of an example method 1100 for updating a temperature $T_3$ of heat transfer fluid 101 entering heat pump HP-1 of system 100. Method 1100 may update the Latest Heat Pump Entering Liquid Temperature data which is the latest data for the temperature $T_3$ of the heat transfer liquid temperature entering heat pump HP-1 after GHX Pump (i.e. fluid circulation device P-1) has been on past the time when the start delay expires described above with respect to FIG. 4. The start delay allows temperatures within system 100 to stabilize so that the sensor(s) may sense the actual temperature of the heat transfer fluid, e.g. heat transfer fluid 101 coming from ground heat exchanger GHX before updating the data for $T_3$. Once the start delay is done, the start delay may only resets when fluid circulation device P-1. When fluid circulation device P-1 turns off, the Latest Heat Pump Entering Liquid Temperature variable stays constant at the last known value of $T_3$.

Figure 12:
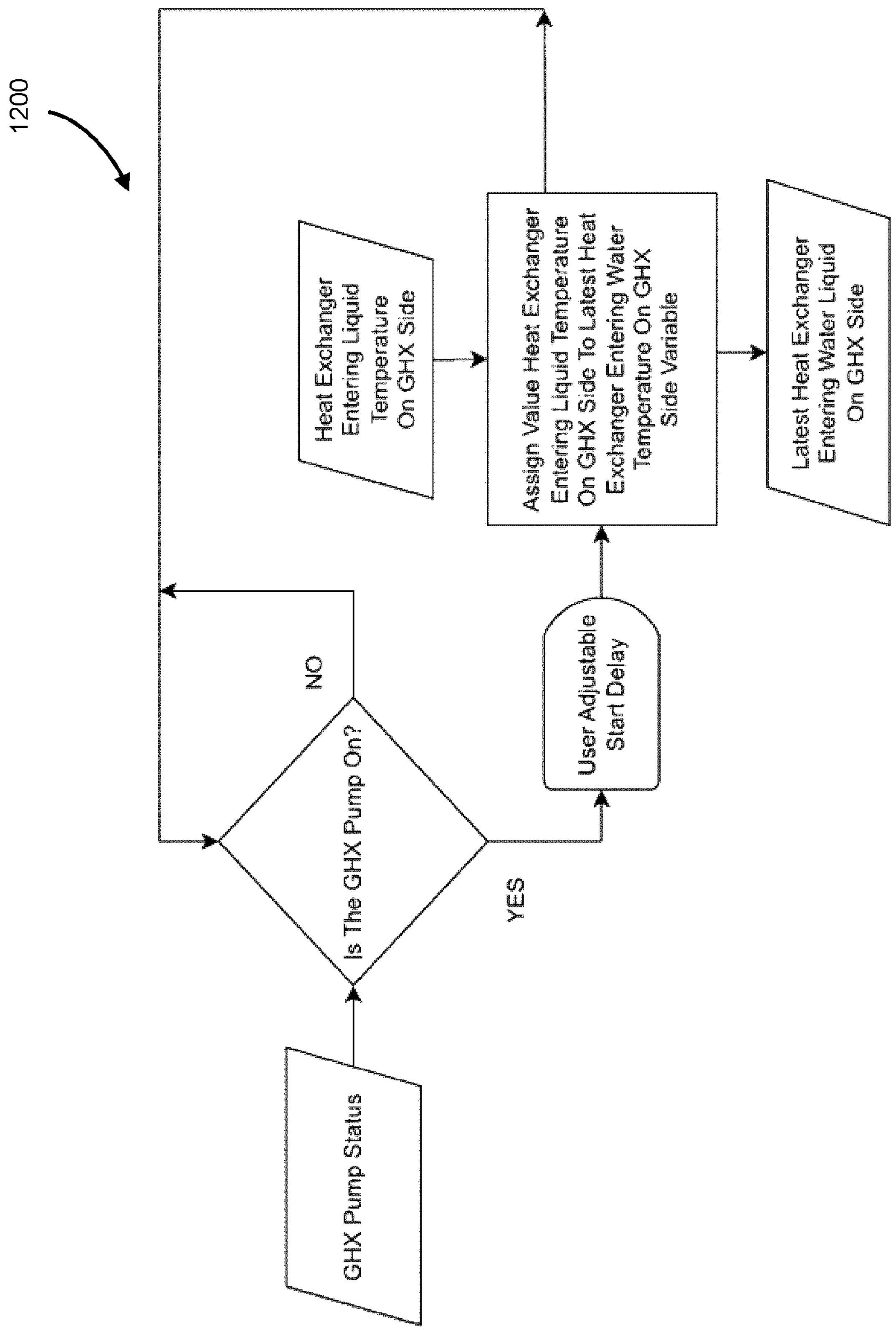
FIG. 12 shows a flowchart of an example method for updating a temperature of a first heating transfer fluid entering the heat exchanger between the energy collector and ground heat exchanger portions of the system of FIG. 1.

FIG. 12 shows a flowchart of a example method 1200 for updating a temperature $T_1$ of heating transfer fluid 101 entering heat exchanger HX-1. Method 1200 may update data for the Latest Heat Exchanger Entering Liquid Temperature on GHX Side variable, which is temperature $T_1$ of heat transfer fluid 101 entering heat exchanger HX-1, after the GHX pump (i.e. fluid circulation device P-1) has been on past the time when the start delay expires which is described above with respect to FIG. 4. The start delay gives the temperatures in system 100 time to stabilize such that the temperature sensor(s) sense the actual temperature of the heat transfer fluid coming into heat exchanger HX-1 from heat pump HP-1 before updating the data. Once the start delay is done, the start delay may only reset when the GHX pump, i.e. fluid circulation device P-1, turns off. When the GHX pump turns off, the Latest Heat Exchanger Entering Liquid Temperature On GHX Side variable stays constant at the last known value.

Figure 13:
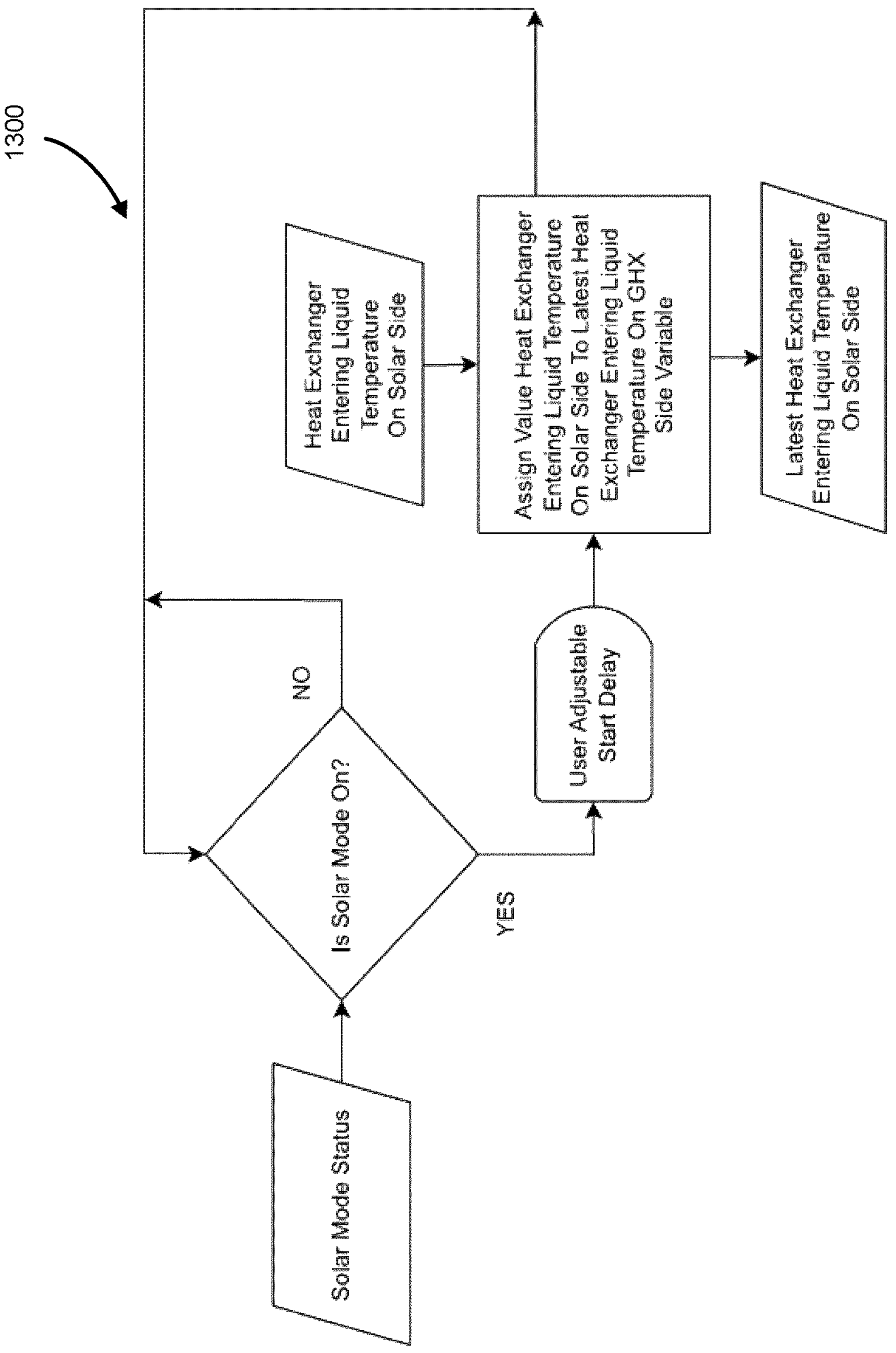
FIG. 13 shows a flowchart of an example method for updating a temperature of a second heating transfer fluid entering the heat exchanger between the energy collector and ground heat exchanger portions of the system of FIG. 1.

FIG. 13 shows a flowchart of an example method 1300 for updating a temperature $T_6$ of a second heating transfer fluid 102 entering heat exchanger HX-1. Method 1300 may update the Latest Heat Exchanger Entering Liquid Temperature on Solar Side variable, i.e. $T_6$, after Solar Mode has been on past the time when the start delay expires which is described above with respect to FIG. 4. The start delay gives the temperature within system 100 time to stabilize such that the sensor may sense the actual temperature of the heat transfer fluid coming into heat exchanger HX-1 from energy collector 103, e.g. solar panel(s), before updating the data for the variable. Once the start delay is done, it only resets when the fluid circulation device P-2 turns off. When the GHX pump, fluid circulation device P-1, turns off, the Latest Heat Exchanger Entering Liquid Temperature On Solar Side variable $T_6$ stays constant at the last known value.

Figure 14:
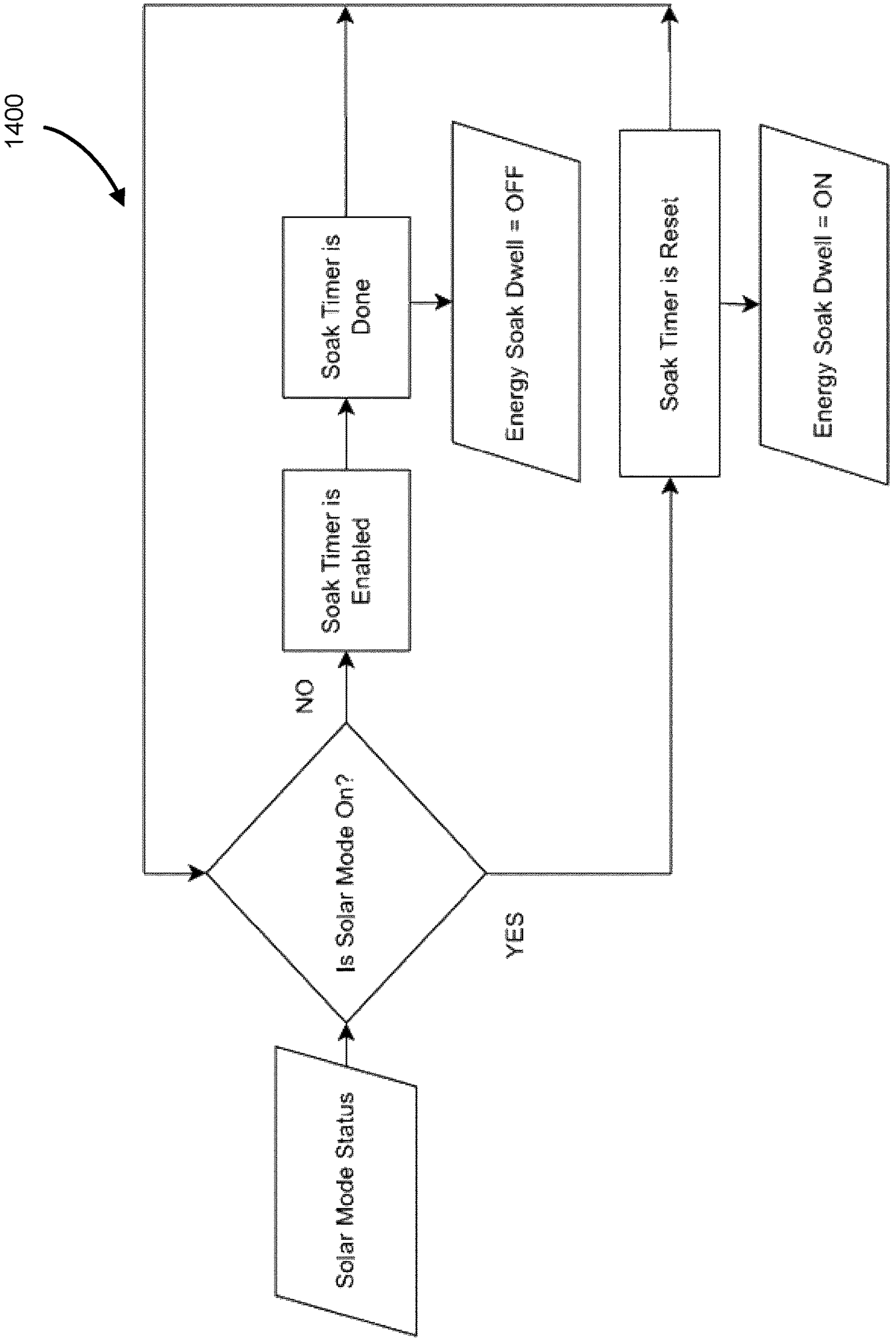
FIG. 14 shows a flowchart of an example method for delaying temperature sensing using the system of FIG. 1 for an energy soak period.

FIG. 14 shows a flowchart of an example method 1400 for delaying temperature sensing using system 100 for an energy soak period. Method 1400 may keep recurring temperature sensing mode(s), described above, from coming on too soon after Solar Mode has turned off. In an embodiment, controller 1608 may be configured to: when the circulation device P-1 is actuated to the fourth mode of operation, i.e. stop circulating the heat transfer fluid, wait for an energy soak period before actuating the first circulation device to operate in the third mode of operation. This may allow thermal energy to dissipate into the ground around ground heat exchanger GHX before using energy to operate fluid circulation devices P-1, P-2 and putting unneeded starts on the circulation devices P-1, P-2. When Solar Mode ends, the soak dwell period may start. When the soak dwell period is over, recurring temperature sensing mode(s), described above, may start again.

Figure 16:
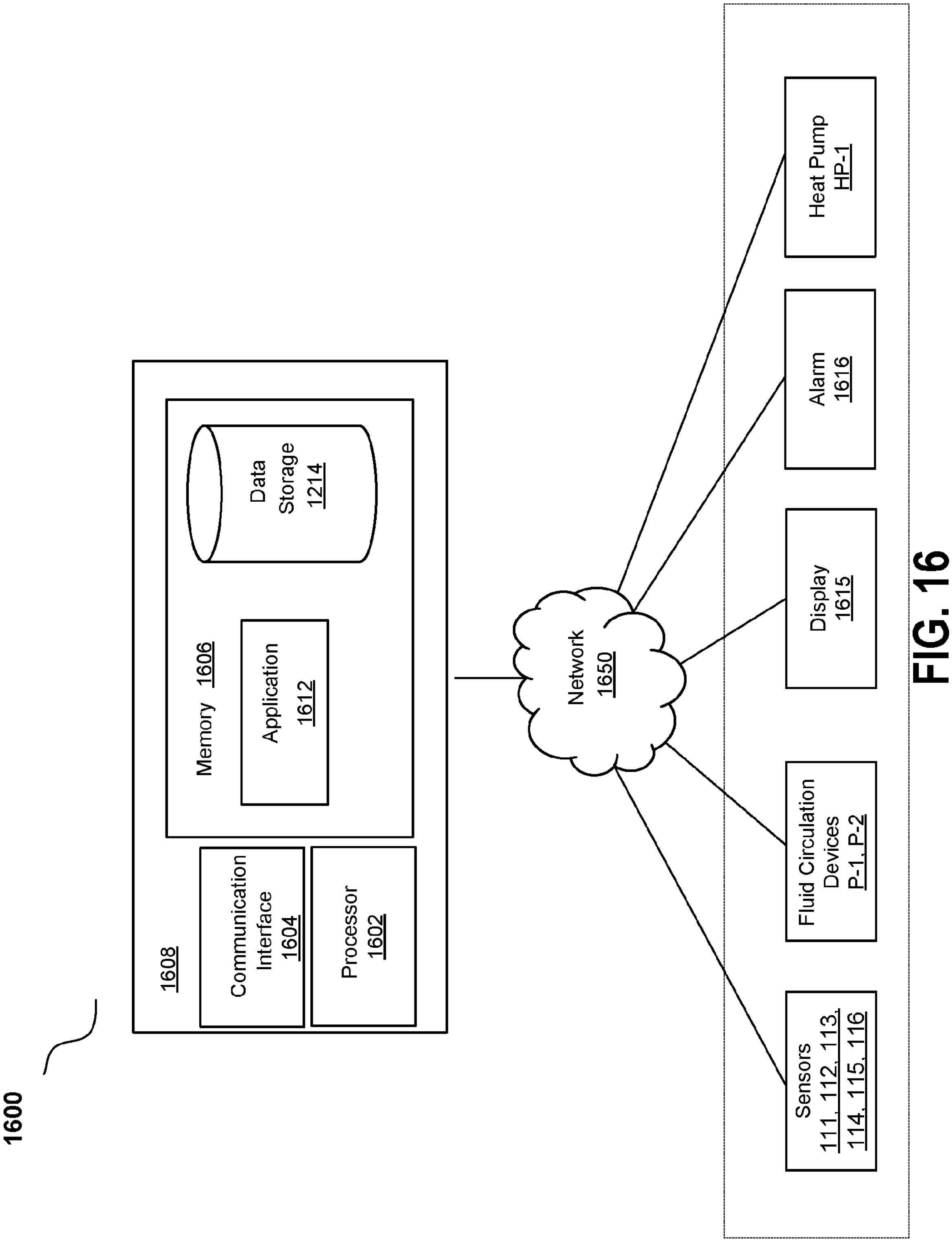
FIG. 16 illustrates a schematic view of a control system for an energy storage system, in accordance with an embodiment of the present application.

FIG. 16 illustrates a schematic view of a control system 1600 for an energy storage system, in accordance with an embodiment according to this disclosure. The energy storage system may be any of the energy storage system described in this disclosure. The embodiment illustrated in FIG. 16 references the system 100 shown in FIG. 1 as a non-limiting example to explain how system 1600 may control an energy storage system according to this disclosure. System 1600 may comprise controller 1608 which, in an example, may be part of a control system of an energy storage system. Controller 1608 includes a processor 1602 configured to implement processor readable instructions that, when executed, configure the processor 1602 to conduct operations described herein. The processor 1602 may be a microprocessor or microcontroller, a digital signal processing (DSP) processor, an integrated circuit, a field programmable gate array (FPGA), a reconfigurable processor, a programmable read-only memory (PROM), or combinations thereof. In a non-limiting example micro-controller may be a 32-bit AURIX™ TriCore™ microcontroller. The controller 1608 may include a communication interface 1604 to communicate with other computing or sensor devices, to access or connect to network resources, or to perform other computing applications by connecting to a network (or multiple networks) capable of carrying data. In some examples, the communication interface 1604 may include one or more busses, interconnects, wires, circuits, and/or any other connection and/or control circuit, or combination thereof. The communication interface 1604 may provide an interface for communicating data between the components of system 100, sensor(s) 111, 112, 113, 114, 115, 116, heat pump HP-1, fluid circulation devices P-1, P-2, display 1615, or an alarm 6016. Display 1615 may be a display on system 100 and/or a remote device such as a computer or remote communication device such as mobile phone. An alarm 1616 described herein, may be any indication that Solar Mode has turned on or off, a seasonal over-temperature threshold has been exceeded, and/or a first or second high temperature limit has been reached for heat transfer fluid going to the ground heat exchanger GHX. Non-limiting examples of alarms are visual alerts on the display or a light; or auditory alerts from a speaker.

Controller 1608 may be coupled to the at least one of a an sensors 111, 112, 113, 114, 115, 116, heat pump HP-1, fluid circulation devices P-1, P-2, display 1615, alarm 1616 via a network 1650. Sensors 111, 112, 113, 114, 115, 116 may each be any of a temperature transducer, a digital temperature sensor, and/or a flow transducer. The network 1650 may include any wired or wireless communication path, such as an electrical circuit. In some embodiments, the network 1650 may include one or more busses, interconnects, wires, circuits, and/or any other connection and/or control circuit, or a combination thereof. In some embodiments, the network 1650 may include a wired or a wireless wide area network (WAN), local area network (LAN), a combination thereof, or the like. In some embodiments, the network 1650 may include a Bluetooth® network, a Bluetooth® low energy network, a short-range communication network, or the like.

Controller 1608 may include memory 1606. The memory 1606 may include one or a combination of computer memory, such as static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

The memory 1606 may store an application 1612 including processor readable instructions for conducting operations described herein. In some examples, application 1612 may include operations for executing methods 200, 300, 400, 500, 600, 700, 800, 900, 1000, 1100, 1200, 1300, 1400, and 1500 described above.

ALTERNATE EMBODIMENTS

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. An energy storage system, the system comprising:

a first heat exchanger for heating first heat transfer fluid in fluid communication with a ground heat exchanger and a heat pump, the first heat exchanger configured to receive the first heat transfer fluid from the heat pump and send the heat transfer fluid to the ground heat exchanger;

a heat pump configured to receive the first heat transfer fluid from the ground heat exchanger, and send the first heat transfer fluid to the first heat exchanger, the heat pump having:

a first mode of operation in which energy is received from a load and transferred to the first heat transfer fluid;

a second of operation in which energy is received from the first heat transfer fluid and transferred to the load;

a first circulation device for circulating the first heat transfer fluid from the ground heat exchanger to the heat pump and the first heat exchanger, and to the ground heat exchanger, the first circulation device having:

a third mode of operation in which the first heat transfer fluid is circulated from the ground heat exchanger to the heat pump, the first heat exchanger, and to the ground heat exchanger, and a fourth mode of operation in which the first circulation device stops circulating the first heat transfer fluid;

an energy collector in fluid communication with the first heat exchanger for transferring energy collected by the energy collector to the first heat exchanger with a second heat transfer fluid, wherein a second circulation device is configured to circulate the second heat transfer fluid between the first heat exchanger and the energy collector, the second circulation device having:

a fifth mode of operation in which the second heat transfer fluid is circulated from the energy collector to the first heat exchanger, and a sixth mode of operation in which the second circulation device stops circulating the second heat transfer fluid;

a controller configured to:

actuate the first circulation device to circulate the first heat transfer fluid in the third mode of operation;

actuate the second circulation device to circulate second heat transfer fluid in the fifth mode of operation;

receive data indicative of $T_1$, $T_4$, and optionally $T_2$, $T_3$, $T_5$, and $T_6$, and after a delay period communicate $T_1$, $T_4$, and optionally $T_2$, $T_3$, $T_5$ and/or $T_6$, to memory for storage;

if $T_4$ is greater than $T_1$ by a first threshold margin, continue actuating the first and second circulation devices to circulate the first and second heat transfer fluids;

if $T_4$ is greater than $T_1$ by less than a second threshold margin, actuate the first circulation device to operate in the fourth mode of operation;

wherein:

$T_1$=temperature of the first heat transfer fluid entering the first heat exchanger;

$T_2$=temperature of the first heat transfer fluid leaving the first heat exchanger;

$T_3$=temperature of the first heat transfer fluid entering the heat pump;

$T_4$=temperature of second heat transfer fluid at outlet of energy collector;

$T_5$=temperature second heat transfer fluid leaving the first exchanger;

$T_6$=temperature of the second heat transfer fluid entering the first heat exchanger.

2. The system of claim 1, wherein the first threshold margin is a temperature in a range of 2-10° C. and the second threshold margin is less than the first threshold margin, preferably the second threshold margin is half of the first threshold margin.

3. The system of claim 1, wherein the delay period is in a range of 1 to 10 minutes, preferably 5 minutes.

4. The system of claim 1, wherein the controller is configured to:

when operating in the third mode of operation and the fifth mode of operation:

receive the data indicative of $T_1$, $T_2$, $T_3$, $T_4$, $T_5$, and/or $T_6$;

calculate a coefficient of performance (COP);

when the COP is greater than or equal to a performance threshold, continue actuating the first circulation device to operate in the third mode of operation and the second circulation device to operate in the fifth mode of operation;

when the COP is less than the performance threshold, actuate the first circulation device to operate in the fourth mode of operation, and actuate the second circulation device to operate in the sixth mode of operation;

wherein:

COP=power through first heat exchanger/power consumption of the first and second circulation devices.

5. The system of claim 4, wherein the performance threshold is greater than 1.

6. The system of claim 1, wherein the controller is configured to:

when $T_2$ or $T_3$ is greater than or equal to a first piping over-temperature threshold for a time period, actuate the second circulation device to operate in the sixth mode of operation, and when $T_2$ or $T_3$ is greater than a second ground heat exchanger over-temperature threshold, actuate the second circulation device to operate in the sixth mode of operation immediately, without a delay;

wherein the first piping over-temperature threshold is a temperature value below a maximum allowable temperature rating of piping conveying the first heat transfer fluid, and the second piping over-temperature value is greater than the first piping over-temperature value, optionally the second piping over-temperature value is about 5-10° C. below the maximum allowable temperature rating of piping, and optionally the first piping over-temperature value is about 10-20° C. below the maximum allowable temperature rating of piping.

7. The system of claim 6, wherein the maximum allowable temperature rating is in a range of 60-90° C.

8. The system of claim 1, wherein the controller is configured to:

actuate the second circulation device to operate in the sixth mode of operation when $T_3$ is greater than a seasonal ground heat exchanger over-temperature threshold, wherein the seasonal ground heat exchanger over-temperature threshold is a temperature value greater than an expected modeled temperature for the day on which $T_3$ is received by the controller, and wherein the expected modeled temperature is calculated using at least one of the heat transfer between the load and heat pump, capacity ratings and size of the energy collector, ambient outdoor temperatures, and heat transfer characteristic of the ground and ground heat exchanger, optionally the seasonal ground heat exchanger over-temperature is in a range of about 1-10° C. greater than the expected modeled temperature.

9. The system of claim 1, wherein the first heat exchanger, the ground heat exchanger, and the heat pump define a first closed loop flow path.

10. The system of claim 1, wherein the first and second heat transfer fluids are any one of water, glycol, brine, mineral oil, and molten salts.

11. The system of claim 1, wherein the second heat transfer fluid is circulated between the first heat exchanger and the energy collector with a second circulation device in a second closed loop flow path.

12. The system of claim 1, wherein the controller is configured to:

when the first circulation device is actuated to the fourth mode of operation, wait for an energy soak period before actuating the first circulation device to operate in the third mode of operation.

13. A method of operating an energy storage system, the method comprising:

receiving data indicative of $T_1$, $T_4$, and optionally $T_2$, $T_3$, $T_5$, and $T_6$, wherein:

$T_1$=temperature of a first heat transfer fluid entering a first heat exchanger from a ground heat exchanger;

$T_2$=temperature of the first heat transfer fluid leaving the first heat exchanger to a ground heat exchanger;

$T_3$=temperature of the first heat transfer fluid entering a heat pump;

$T_4$=temperature of a second heat transfer fluid at an outlet of an energy collector;

$T_5$=temperature of the second heat transfer fluid leaving the first heat exchanger;

$T_6$=temperature of a second heat transfer fluid entering the first heat exchanger from a energy collector;

actuating a first circulation device to circulate the first heat transfer fluid between the first heat exchanger, ground heat exchanger, and the heat pump;

actuating a second circulation device to circulate the second heat transfer fluid between the energy collector and the first heat exchanger; wherein the first and second heat transfer fluids are in thermal communication in the first heat exchanger;

after a delay period:

when $T_4$ is greater than $T_1$ by a first threshold margin, continue actuating the first circulation device to circulate the first and second heat transfer fluids, when $T_4$ is greater than $T_1$ by less than a second threshold margin, wherein the second offset threshold is less than the first offset threshold, actuate the first circulation device and the second circulation device to stop circulating the first and second heat transfer fluids.

14. The method of claim 13, comprising:

while actuating the first and second circulation devices to circulate the first and second heat transfer fluid:

receive the data indicative of $T_1$, $T_2$, $T_3$, $T_4$, $T_5$, and $T_6$;

calculate a coefficient of performance (COP);

when the COP is greater than or equal to a performance threshold, actuate the first circulation device to circulate the first heat transfer fluid, and actuate the second circulation device to circulate the second heat transfer fluid;

when the COP is less than the performance threshold, actuate the first circulation device to stop circulation of the first heat transfer fluid, and actuate the second circulation device to stop circulation of the second heat transfer fluid;

wherein:

COP=power through first heat exchanger/combined power consumption of the first and second circulation devices; and the performance threshold is greater than 1.

15. The method of claim 13, comprising:

receiving the data indicative of at least one of $T_2$ and $T_3$;

when $T_2$ or $T_3$ is greater than or equal to a first piping over-temperature threshold for a time period, actuate the second circulation device to stop circulating the second heat transfer fluid, when $T_2$ or $T_3$ is greater than a second ground heat exchanger over-temperature threshold, actuate the second circulation device to stop circulating the second heat transfer fluid immediately;

wherein the first piping over-temperature threshold is a temperature value below a maximum allowable temperature rating of piping conveying the first heat transfer fluid, and the second piping over-temperature value is greater than the first piping over-temperature value, optionally the second piping over-temperature value is about 5-10° C. below the maximum allowable temperature rating of the piping, and optionally the first piping over-temperature value is about 10-20° C. below the maximum allowable temperature rating of the piping.

16. The method of claim 13, comprising:

receiving the data indicative of $T_3$; and actuating the first circulation device to stop circulating the first heat transfer fluid when $T_3$ is greater than a seasonal ground heat exchanger over-temperature threshold, wherein the seasonal ground heat exchanger over-temperature threshold is a temperature value greater than an expected modeled temperature for the day on which $T_3$ is received by the controller;

wherein the expected modeled temperature is calculated using at least one of the heat transfer between the load and heat pump, capacity ratings and size of the energy collector, ambient outdoor temperatures, and heat transfer characteristic of the ground and ground heat exchanger, optionally the seasonal ground heat exchanger over-temperature is in a range of about 1-10° C. greater than the expected modeled temperature.

17. The method of claim 13, when the first circulation device is actuated to stop circulating the first heat transfer fluid, wait for an energy soak period before actuating the first circulation device to circulate the first heat transfer fluid.

18. A computer program product for implementing control of energy transfer with an energy storage system, the computer program product comprising a non-transitory computer readable storage medium having program code embodied therewith, the program code readable/executable by a computer, processor or logic circuit to perform a method defined in claim 13.

* * * * *